(12) United States Patent
Czaplewski et al.

(10) Patent No.: US 9,944,826 B2
(45) Date of Patent: Apr. 17, 2018

(54) DYNAMIC POLYMER MATERIAL FOR 3D PRINTING

(71) Applicant: INTERNATIONAL BUSINESS MACHINES CORPORATION, Armonk, NY (US)

(72) Inventors: Sarah K. Czaplewski, Rochester, MN (US); Joseph Kuczynski, North Port, FL (US); Jason T. Wertz, Pleasant Valley, NY (US); Jing Zhang, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/000,541

(22) Filed: Jan. 19, 2016

(65) Prior Publication Data

US 2017/0204292 A1 Jul. 20, 2017

(51) Int. Cl.
*C08F 290/04* (2006.01)
*C09D 187/00* (2006.01)
*C09D 153/02* (2006.01)

(52) U.S. Cl.
CPC ....... *C09D 187/005* (2013.01); *C09D 153/02* (2013.01)

(58) Field of Classification Search
CPC .. C09D 187/005; C09D 153/02; C08F 290/04
See application file for complete search history.

(56) References Cited

U.S. PATENT DOCUMENTS

| 6,017,640 | A | * | 1/2000 | Muthiah | ............... | C08F 290/12 427/189 |
| 7,967,587 | B2 | | 6/2011 | Bradley | | |
| 9,076,082 | B1 | | 7/2015 | Cudak et al. | | |
| 9,090,004 | B2 | | 7/2015 | Kuczynski et al. | | |
| 2004/0024079 | A1 | * | 2/2004 | Erickson | ................. | C08L 53/00 522/3 |
| 2014/0072777 | A1 | | 3/2014 | Boday et al. | | |
| 2015/0183161 | A1 | | 7/2015 | Molinari et al. | | |
| 2016/0262917 | A1 | * | 9/2016 | Chen | ....................... | A61L 31/14 |

FOREIGN PATENT DOCUMENTS

| CN | 203030471 U | 7/2013 |
| CN | 103231513 A | 8/2013 |
| CN | 103231514 A | 8/2013 |
| CN | 103862678 A | 6/2014 |
| CN | 103878983 A | 6/2014 |
| CN | 203649400 U | 6/2014 |
| CN | 204095145 U | 1/2015 |
| JP | H08-230048 A | 9/1996 |
| WO | 2005032837 A1 | 4/2005 |

OTHER PUBLICATIONS

Jahnke et al (Photo crosslinking of copolymeric methacrylates bearing stilbene chromophores, Z. Naturforsch 2012, 67b, 1132-1136), 2012.*
U.S. Appl. No. 14/967,810, entitled "Pulsed UV Light Nozzle for Selective Curing of 3D Printed Material," as filed on Dec. 14, 2015.
International Business Machines Corporation, entitled, "Appendix P: US Patents or Patent Applications Treated as Related," filed on Mar. 21, 2017.

* cited by examiner

*Primary Examiner* — Wenwen Cai
(74) *Attorney, Agent, or Firm* — Patterson + Sheridan, LLP

(57) ABSTRACT

A polymer network for 3D printing has a first polymer and a second polymer. The first polymer and the second polymer are crosslinked by a photo-crosslink. The first polymer and the second polymer are independently selected from polylactic acid, poly(acrylonitrile butadiene styrene), polystyrene, nylon, high density polyethylene, polycarbonate, polyvinyl alcohol, polyethylene terephthalate, and thermoplastic polymers.

16 Claims, 1 Drawing Sheet

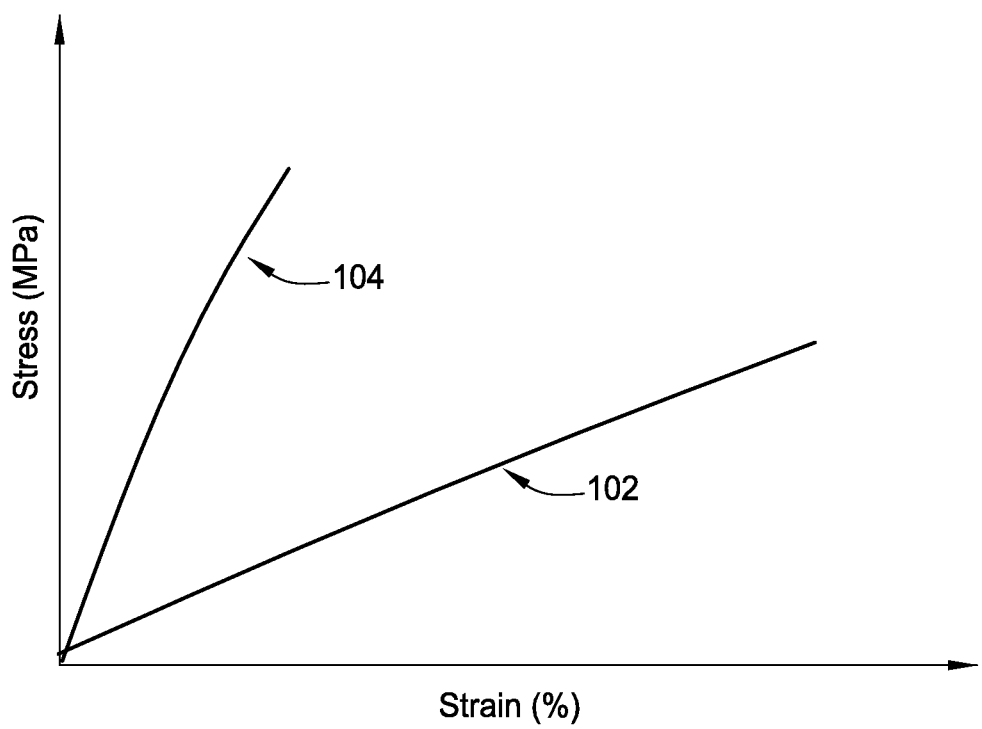

DYNAMIC POLYMER MATERIAL FOR 3D PRINTING

The present disclosure relates to new 3D printing methods, polymers, and polymer materials.

BACKGROUND 3D printing has attracted significant attention for its potential as a new manufacturing process offering remarkable versatility in the ability to rapidly produce tailored physical objects from the micro to macro scale. While the foundations of this technology were laid in the late 1980s, modern advancements have produced 3D-printers for applications such as home use, rapid prototyping, and production of biomedical devices. The hardware utilized in this field is rapidly maturing, and the materials used in the printing process generally includes traditional commercial polymers. Hardware for curing a deposited 3D material is typically limited to curing the entirety of the deposited material. However, physical property requirements for use of some 3D printed materials/objects sometimes include different physical properties at different areas of the 3D-printed object. The field of 3D-printing could be significantly impacted by expanding the repertoire of materials available as printable media.

SUMMARY

In some embodiments, a polymer material for 3D printing has a first polymer and a second polymer. The first polymer and the second polymer are crosslinked by a photo-crosslink forming a polymer network. The first polymer and the second polymer are independently selected from polylactic acid, poly(acrylonitrile butadiene styrene), polystyrene, nylon, high density polyethylene, polycarbonate, polyvinyl alcohol, polyethylene terephthalate, and thermoplastic polymers.

In some embodiments, a polymer material for 3D printing is the reaction product of a first polymer and a second polymer. The first polymer and the second polymer are independently selected from polylactic acid, poly(acrylonitrile butadiene styrene), polystyrene, nylon, high density polyethylene, polycarbonate, polyvinyl alcohol, polyethylene terephthalate, and thermoplastic polymers. The first polymer and/or the second polymer is substituted with a photo-crosslinkable moiety.

BRIEF DESCRIPTION OF THE DRAWINGS

So that the manner in which the above recited features of the present disclosure can be understood in detail, a more particular description of the present disclosure, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

FIG. 1 illustrates the storage modulus of a reaction mixture/polymer network containing polymers having photo-crosslinkable/crosslinked moieties, according to some embodiments.

DETAILED DESCRIPTION

In some embodiments, a polymer material for 3D printing has a first polymer and a second polymer. The first polymer and the second polymer are crosslinked by a photo-crosslink forming a polymer network. The first polymer and the second polymer are independently selected from polylactic acid, poly(acrylonitrile butadiene styrene), polystyrene, nylon, high density polyethylene, polycarbonate, polyvinyl alcohol, and polyethylene terephthalate. First and second polymers also include thermoplastic polymers such as styrenic block copolymers (thermoplastic elastomers, TPE-s), thermoplastic olefins (TPE-o), elastomeric alloys (TPE-v or TPV), thermoplastic polyurethanes (TPU), thermoplastic copolyesters, and thermoplastic polyamides.

A photo-crosslink may be formed by irradiating a reaction mixture with ultraviolet light, the reaction mixture having one or more polymers having a photo cross-linkable moiety. Suitable ultraviolet light sources include a light pipe, a fiber, and/or a bulb. A photo-crosslink may be photo-reversible. For example, a first polymer and second polymer that are crosslinked by a photo-crosslink may be irradiated with ultraviolet light to decompose the cross-link. In some embodiments, decomposition of a photo-crosslink yields starting material such as a polymer having a photo-cross-linkable moiety. A photo-crosslink may be formed at a wavelength between about 200 nm and about 400 nm, such as about 300 nm and about 350 nm. The photo-crosslink may be photo-reversible at a wavelength between about 200 nm and about 350 nm, such as about 250 nm and about 300 nm, for example about 260 nm. A photo-crosslink may be an anthracene dimer, cinnamic acid dimer, coumarin dimer, thymine dimer, and stilbene dimer. A photo-crosslink may be substituted with one or more electron-withdrawing groups and/or one or more electron-donating groups. Electron-withdrawing groups include —NO$_2$, —OH, aryl and halo. Aryl includes C1-C15 aromatic hydrocarbons, such as phenyl and benzyl. Halo includes fluoro, chloro, bromo, and iodo. Electron-donating groups include linear or branched alkyl and alkoxy. Alkyl includes C1-C20 alkyl, such as C2-C6 alkyl. Alkoxy includes C1-C20 alkoxy, such as C2-C6 alkoxy. In some embodiments, anthracene dimer is:

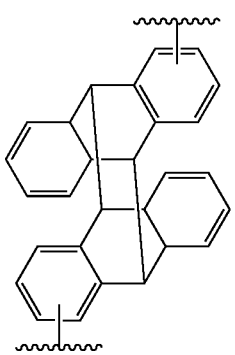

, cinnamic acid dimer is:

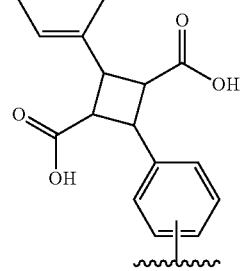

, coumarin dimer is:

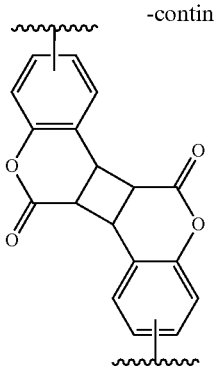

, thymine dimer is:

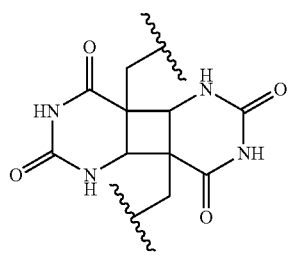

, and stillbene dimer is:

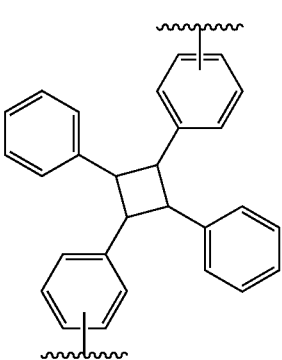

In some embodiments, a portion of the polymer material that is a cross-linked first and second polymer network has between about 10 percent by weight (wt %) and about 90 wt % cross-linked polymers, such as a first polymer and/or a second polymer. A polymer material that is the cross-linked first and second polymer network may have between about 40 wt % and about 60 wt % cross-linked first polymer and second polymer. The remaining wt % of a polymer material may include one or more additional polymers (such as substituted or unsubstituted polymers), one or more fillers, and/or one or more pigments. Any of a number of suitable fillers, such as thermally conductive fillers, (e.g., boron nitride, aluminum oxide, etc.) may be added to a reaction mixture at loading levels between about 1 wt % and about 80 wt %, such as about 5 wt % and about 40 wt %. The filler may be added to the reaction mixture before, during, or after the reaction mixture is deposited onto a substrate. The filler may be isotropically dispersed throughout a reaction mixture/polymer material via one of several common techniques, including but not limited to, twin screw extrusion. Following dispersion of the thermally conductive filler, the reaction mixture/polymer material may be heated and extruded to align both the polymer chains as well as the filler. Pigments include multiwalled carbon nanotubes (multiwalled CNTs), carbon black, clay, limestone, among others.

In some embodiments, a polymer material has a first polymer and a second polymer that are crosslinked forming a polymer network and are of the structure:

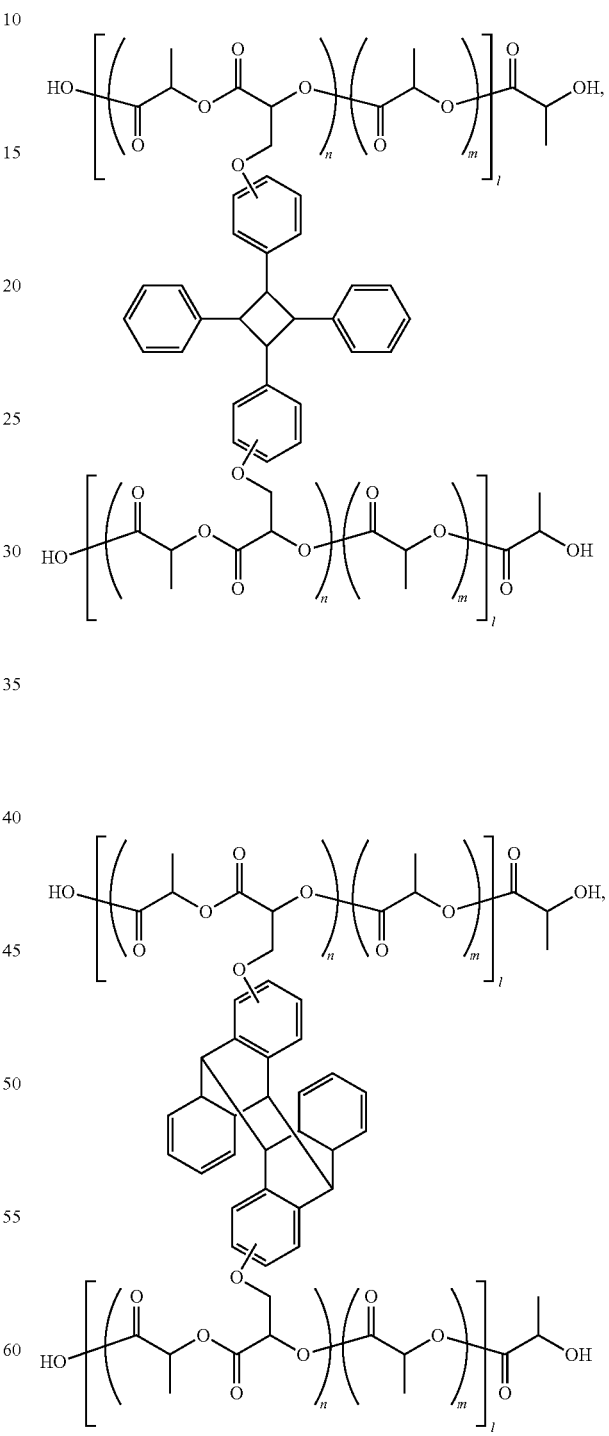

-continued

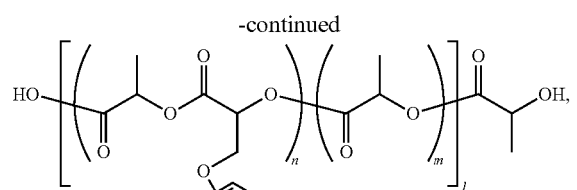

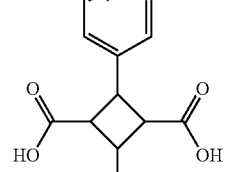

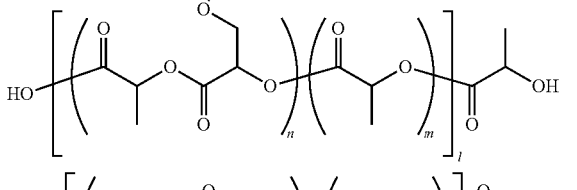

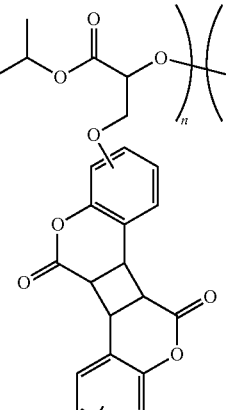

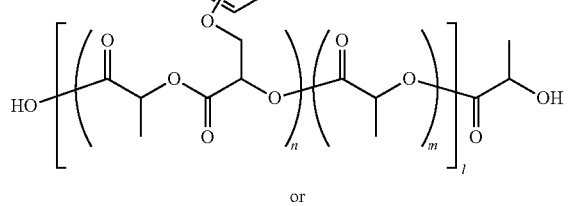

or

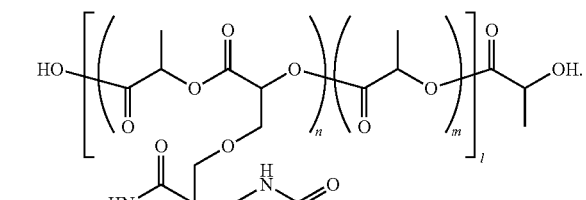

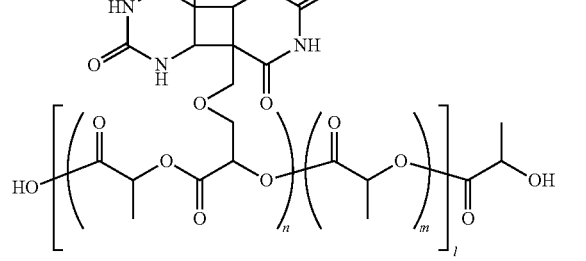

'n' is a positive integer, such as between about 1 and about 100, such as about 1 and about 10. 'm' is a positive integer, such as between about 1 and about 100, such as about 2 and about 20. 'l' is a positive integer, such as between about 100 and about 10,000, such as about 700 and about 5000. Ranges described herein, for example, "between # and about #" and "between about # and about #" include the number recited within the range. For example, a range "between 0 and about 10" includes 0 and 10 within the recited range.

In some embodiments, a polymer material has a first polymer and a second polymer that are crosslinked forming a polymer network and are of the structure:

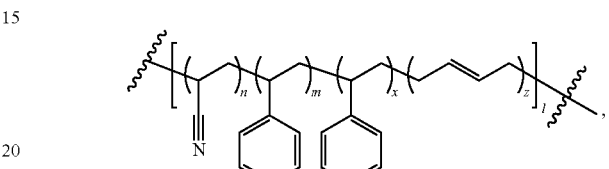

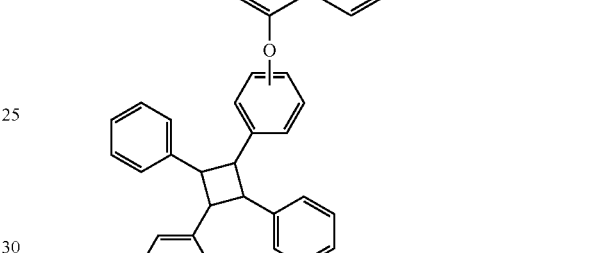

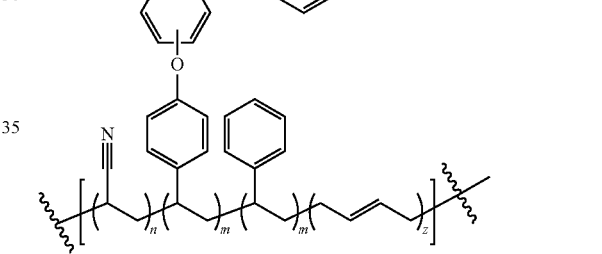

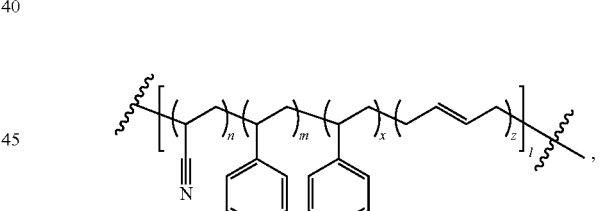

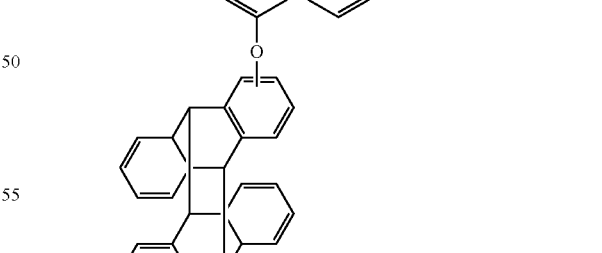

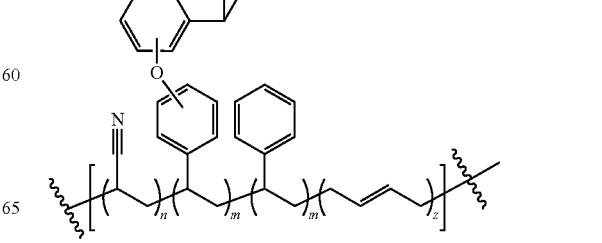

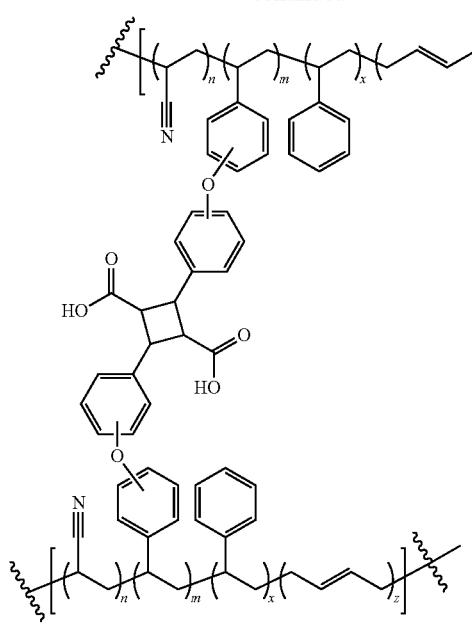

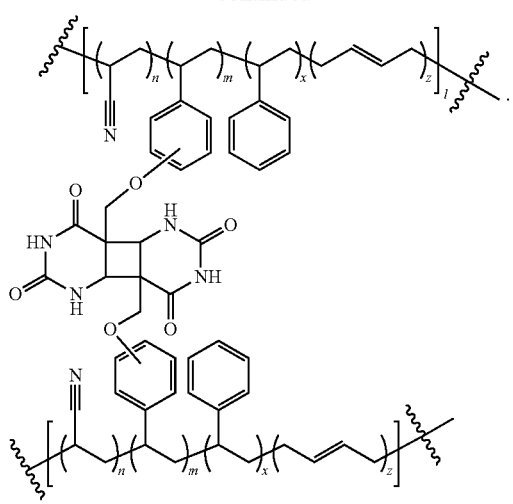

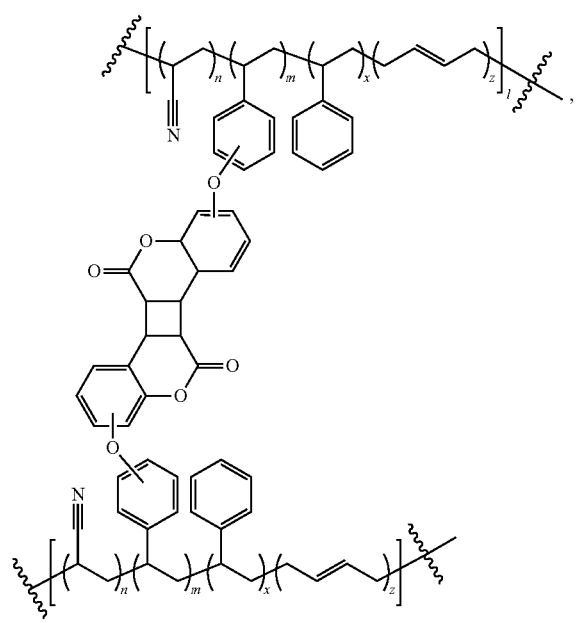

or

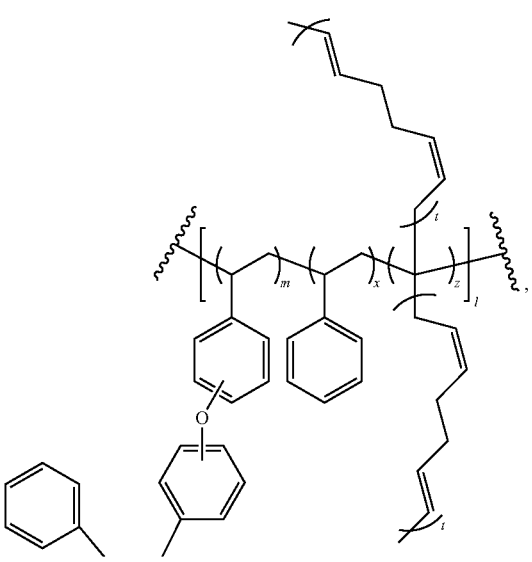

'n' is a positive integer, such as between about 1 and about 100, such as about 5 and about 35. 'm' is a positive integer, such as between about 1 and about 100, such as about 5 and about 60. 'x' is an integer, such as between about 0 and about 90, such as about 1 and about 200. 'z' is a positive integer, such as between about 1 and about 100, such as about 5 and about 35. 'l' is a positive integer, such as between about 100 and about 10,000, such as about 700 and about 5000.

In some embodiments, a polymer material has a first polymer and a second polymer that are crosslinked forming a polymer network and are of the structure:

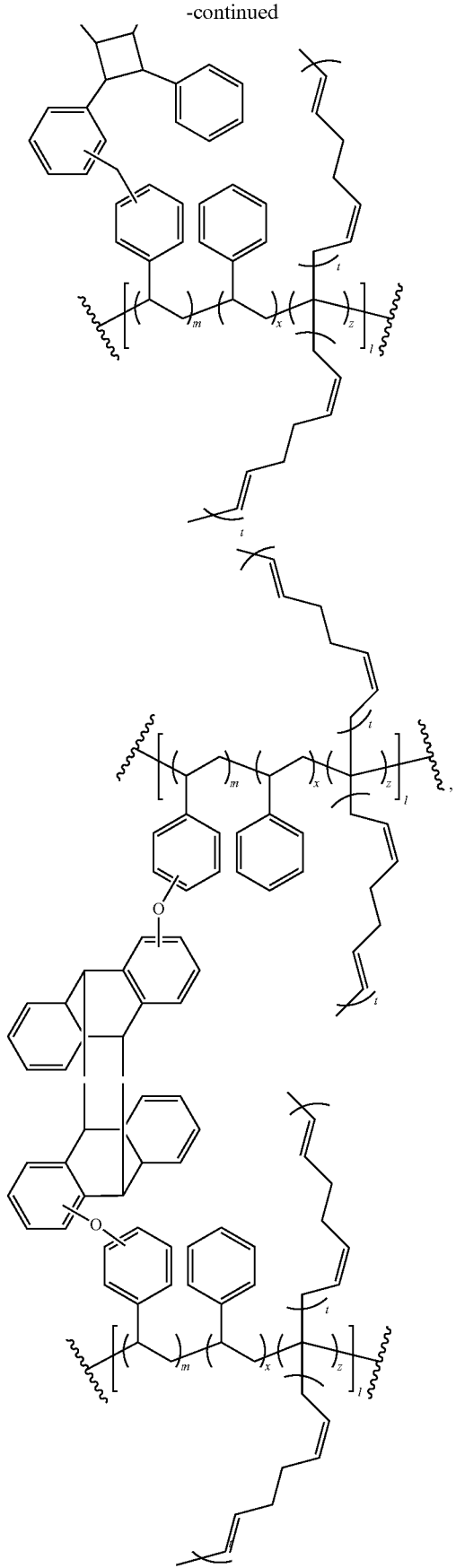
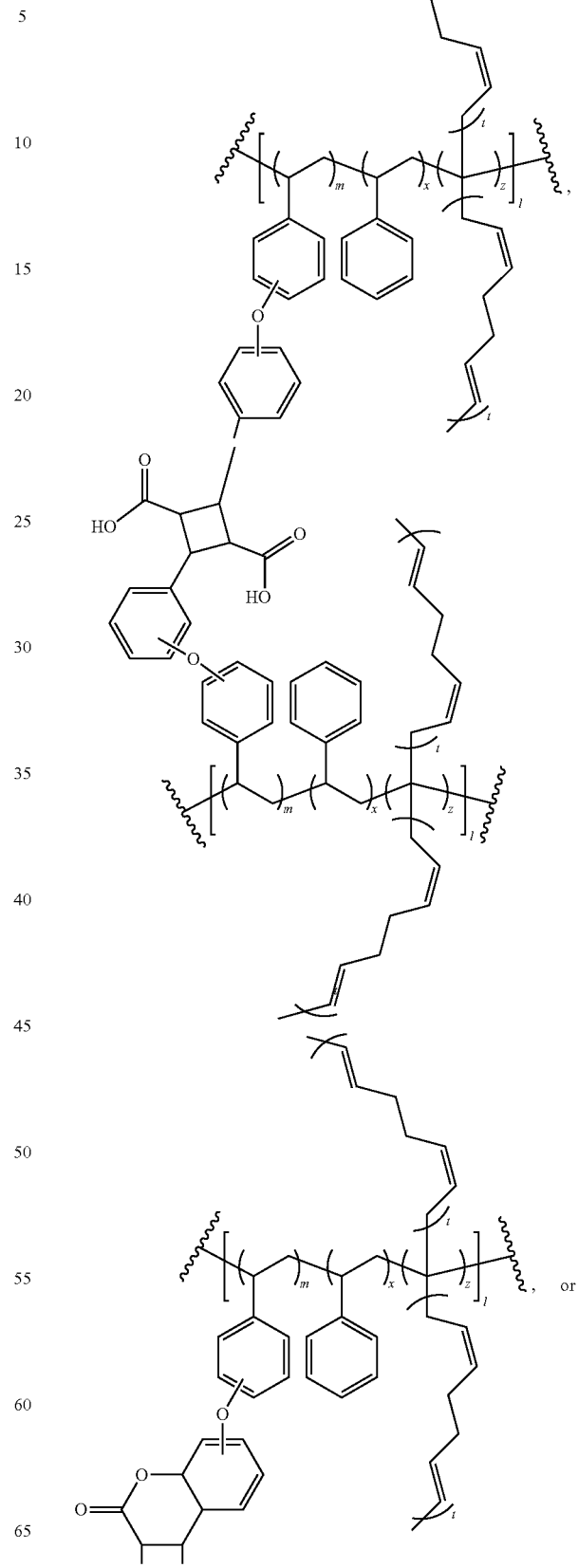

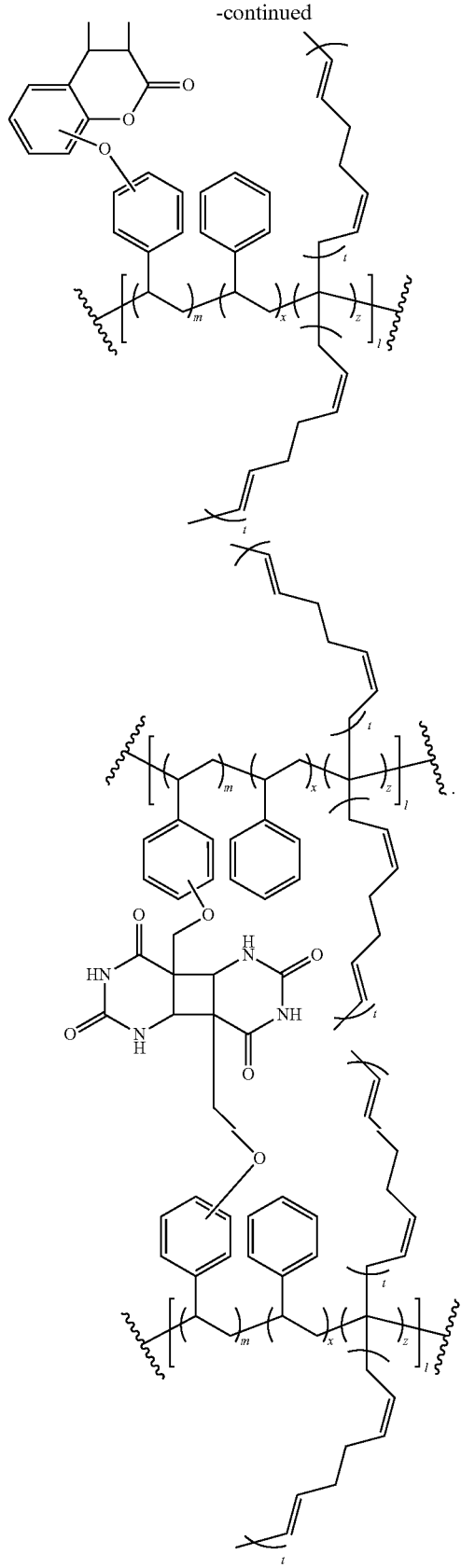

'm' is a positive integer, such as between about 1 and about 200, such as about 5 and about 60. 'x' is a positive integer, such as between about 0 and about 150, such as about 1 and about 90. 'z' is a positive integer, such as between about 1 and about 100, such as about 5 and about 35. 't' is a positive integer, such as between about 1 and about 100, such as about 20 and about 60. 'l' is a positive integer, such as between about 100 and about 10,000, such as about 700 and about 5000.

In some embodiments, a polymer material has a first polymer and a second polymer that are crosslinked forming a polymer network and are of the structure:

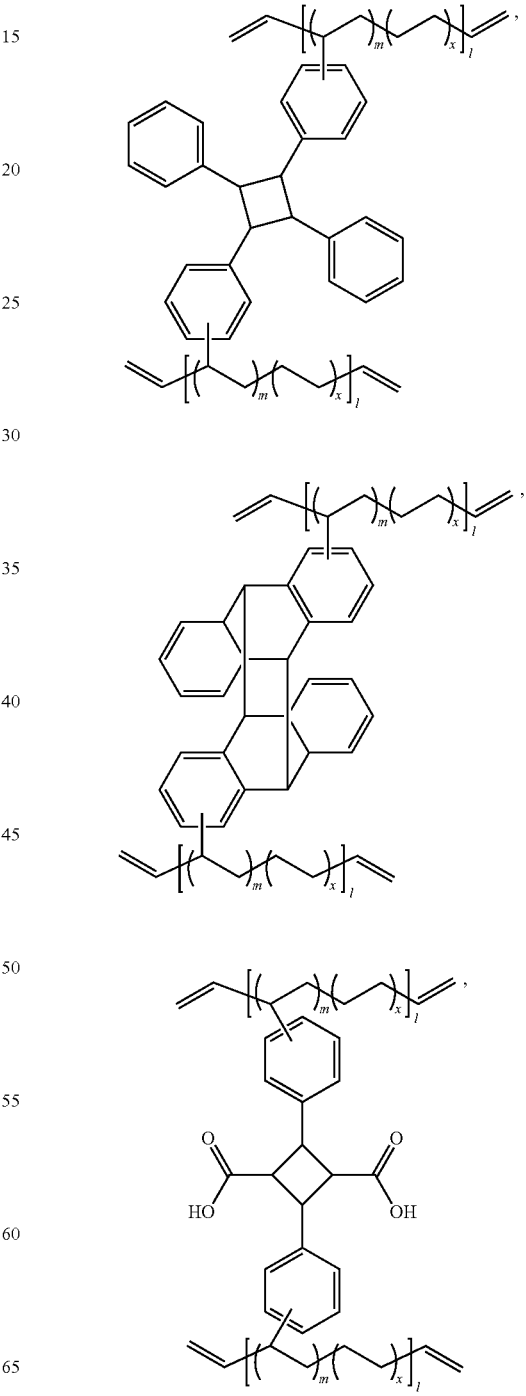

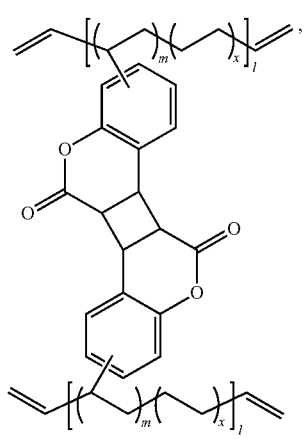

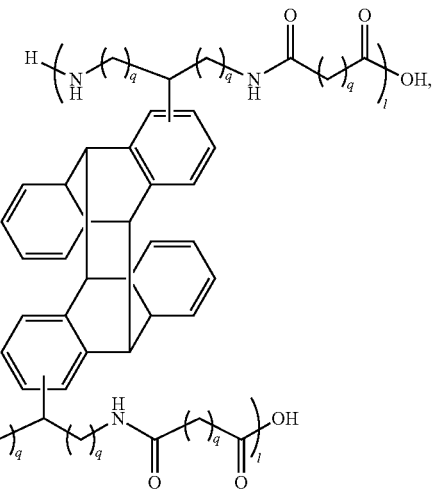

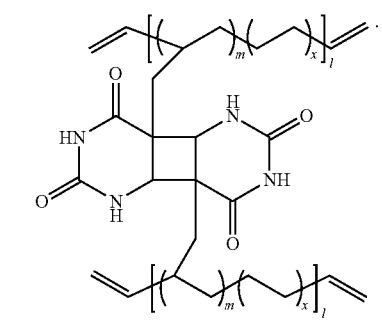

'm' is a positive integer, such as between about 1 and about 100, such as about 1 and about 10. 'x' is a positive integer, such as between about 1 and about 100, such as about 2 and about 20. 'l' is a positive integer, such as between about 100 and about 10,000, such as about 700 and about 5000.

In some embodiments, a polymer material has a first polymer and a second polymer that are crosslinked forming a polymer network and are of the structure:

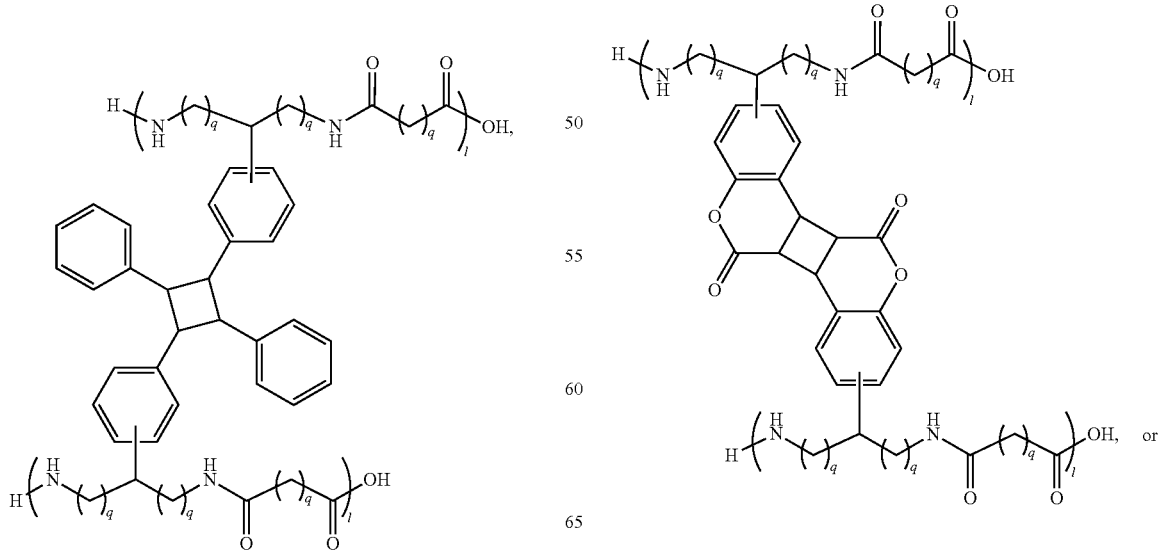

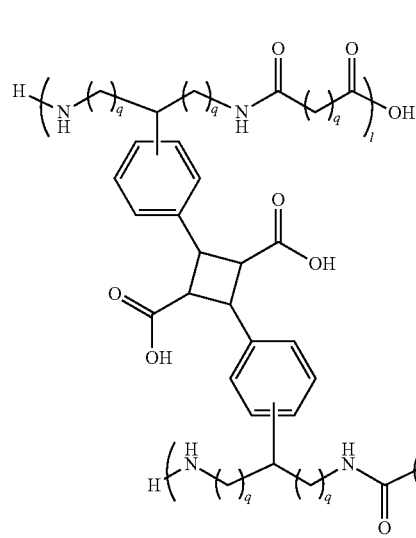

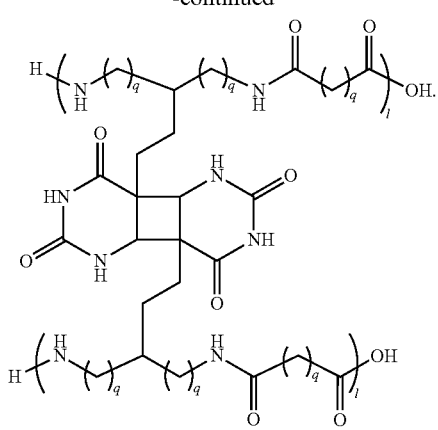

'q' is a positive integer between about 1 and about 30, such as 1 and about 10, and 'l' is a positive integer, such as between about 100 and about 10,000, such as about 700 and about 5000.

In some embodiments, a polymer material has a polymer that is not crosslinked to another polymer (e.g., a third polymer). A polymer that is not crosslinked to another polymer may be unsubstituted or substituted with one or more electron-donating groups and/or one or more electron-withdrawing groups. Electron-withdrawing groups include —NO$_2$, —OH, aryl and halo. Aryl includes C1-C15 aromatic hydrocarbons, such as phenyl and benzyl. Halo includes fluoro, chloro, bromo, and iodo. Electron-donating groups include linear or branched alkyl and alkoxy. Alkyl includes C1-C20 alkyl, such as C2-C6 alkyl. Alkoxy includes C1-C20 alkoxy, such as C2-C6 alkoxy. A polymer that is not crosslinked to another polymer may be substituted or unsubstituted polylactic acid, poly(acrylonitrile butadiene styrene), polystyrene, nylon, high density polyethylene, polycarbonate, polyvinyl alcohol, polyethylene terephthalate, or a thermoplastic polymer. A polymer that is not crosslinked to another polymer may be substituted with a cross-linkable moiety, but not cross-linked. For example, a polymer that is substituted but is not crosslinked to another polymer may have the structure:

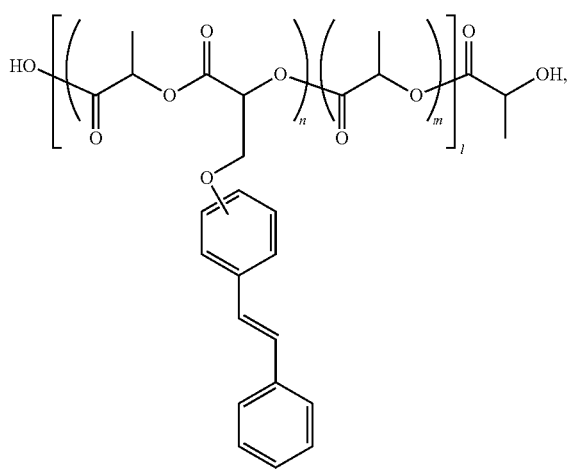

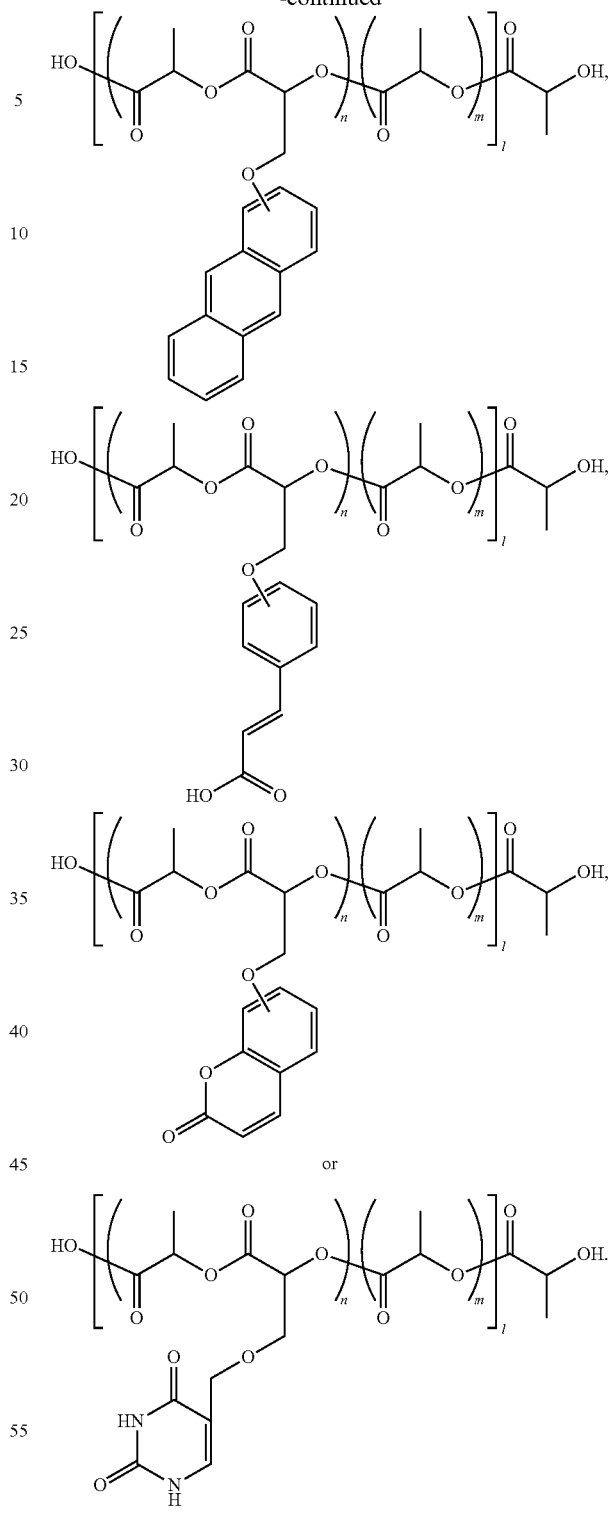

'n' is a positive integer, such as between about 1 and about 100, such as about 1 and about 10. 'm' is a positive integer, such as between about 1 and about 100, such as about 2 and about 20. 'l' is a positive integer, such as between about 100 and about 10,000, such as about 700 and about 5000.

In some embodiments, a polymer that is substituted but is not crosslinked to another polymer has the structure:

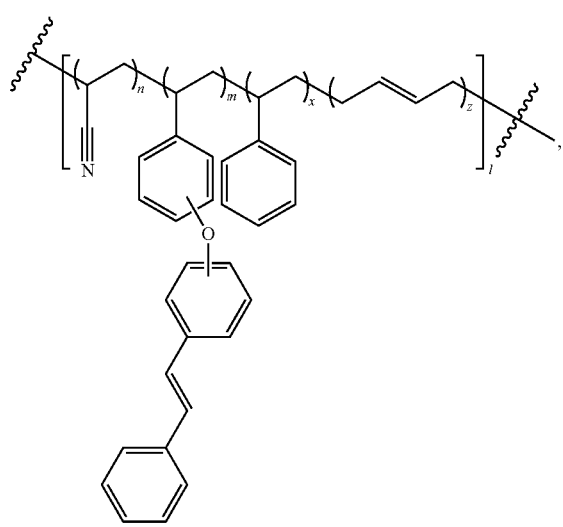

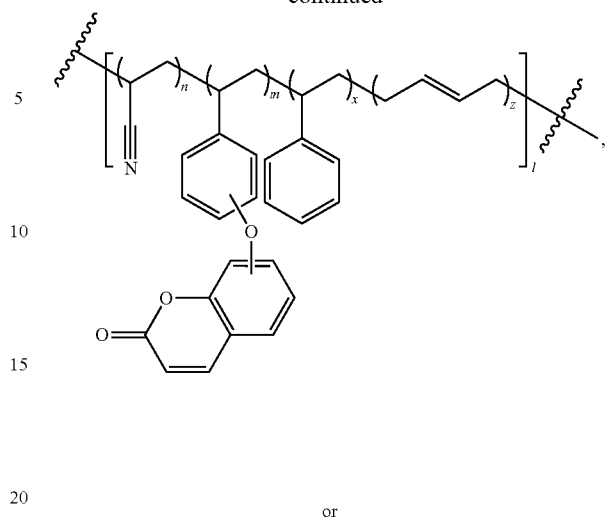

or

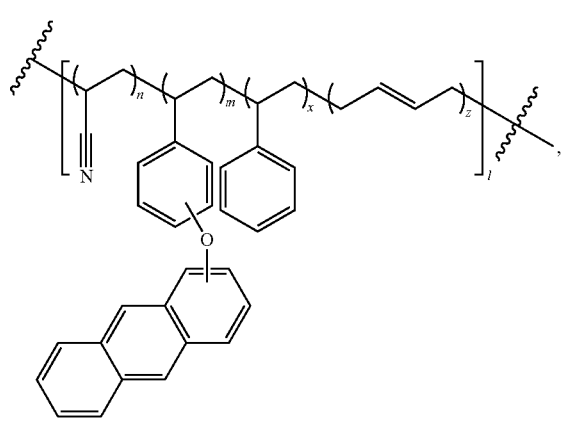

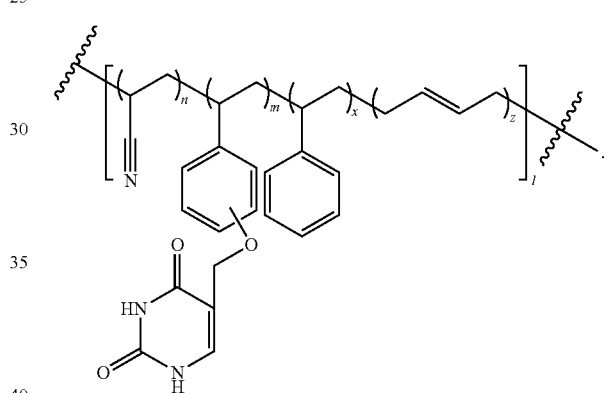

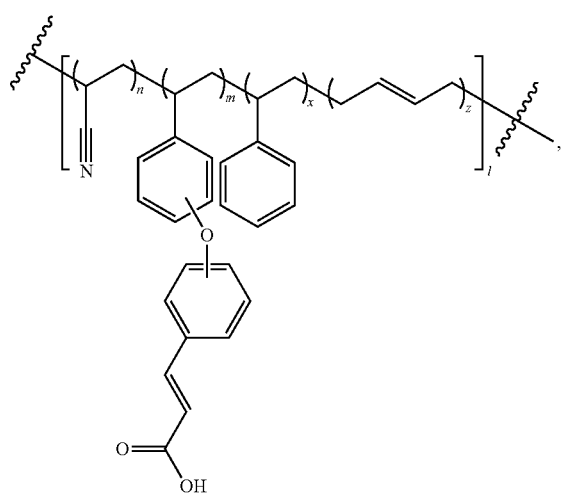

'n' is a positive integer, such as between about 1 and about 100, such as about 5 and about 35. 'm' is a positive integer, such as between about 1 and about 100, such as about 5 and about 60. 'x' is an integer, such as between 0 and about 150, such as about 1 and about 90. 'z' is a positive integer, such as between about 1 and about 100, such as about 5 and about 35. 'l' is a positive integer, such as between about 100 and about 10,000, such as about 700 and about 5000.

In some embodiments, a polymer that is substituted but is not crosslinked to another polymer has the structure:

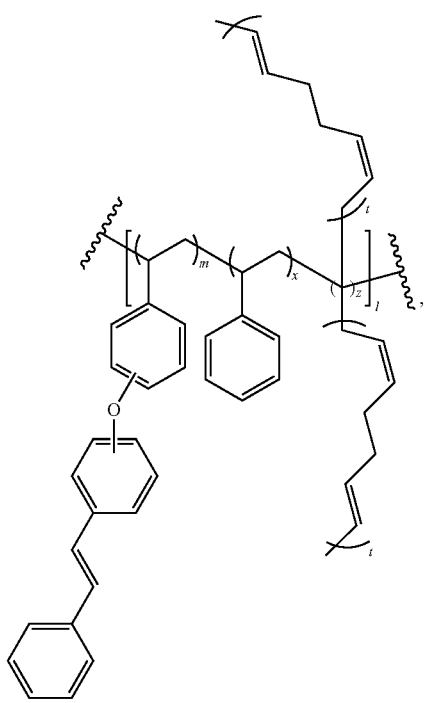
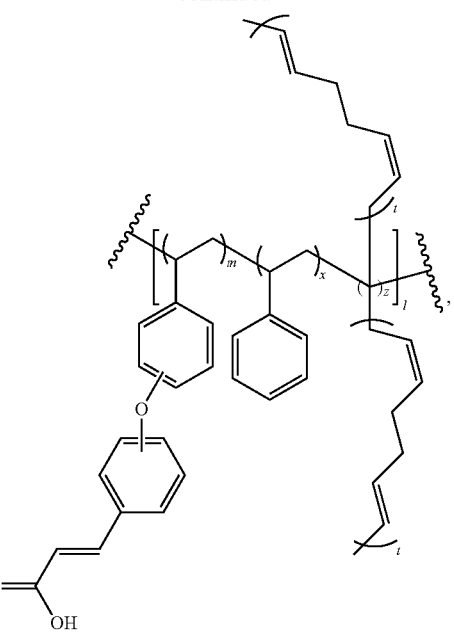
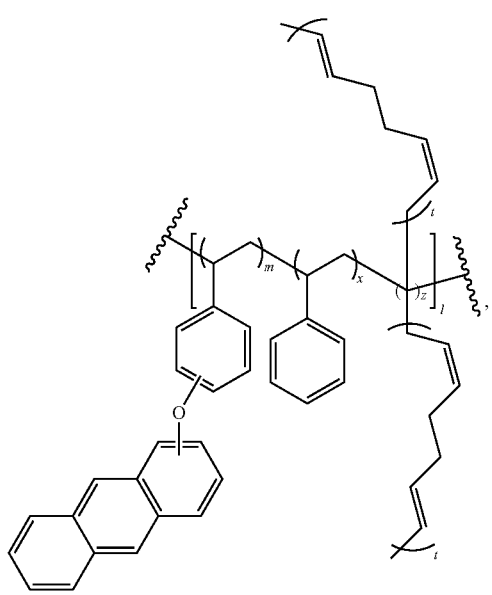
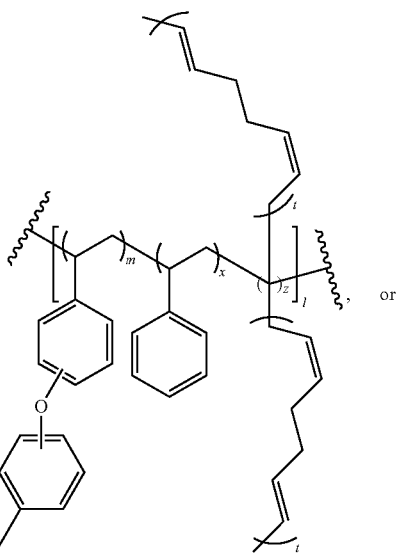 or

-continued

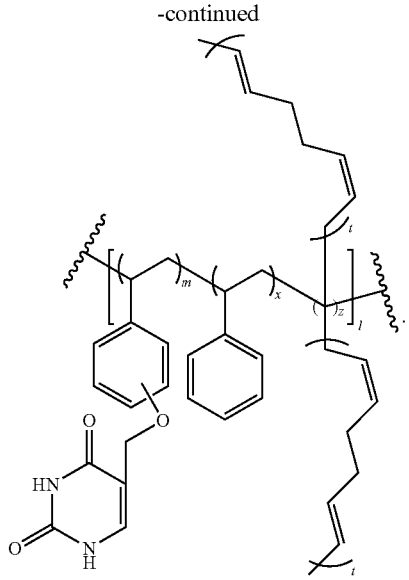

'm' is a positive integer, such as between about 1 and about 100, such as about 5 and about 60. 'x' is an integer, such as between 0 and about 150, such as about 1 and about 90. 'z' is a positive integer, such as between about 1 and about 100, such as about 5 and about 35. 't' is a positive integer, such as between about 1 and about 100, such as about 20 and about 60. 'l' is a positive integer, such as between about 100 and about 10,000, such as about 700 and about 5000.

In some embodiments, a polymer that is substituted but is not crosslinked to another polymer has the structure:

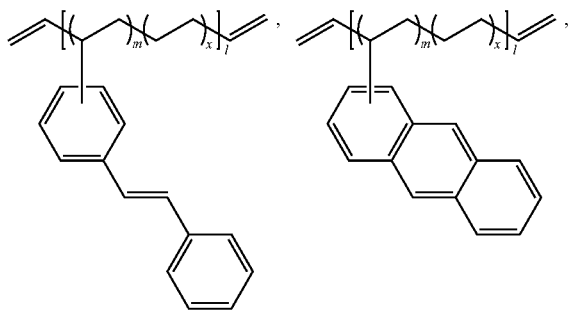

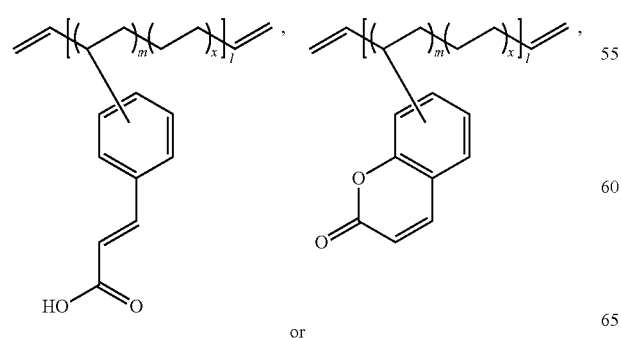

or

-continued

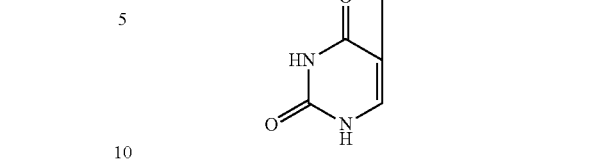

'm' is a positive integer, such as between about 1 and about 100, such as about 1 and about 10. 'x' is a positive integer, such as between about 1 and about 100, such as about 2 and about 20. 'l' is a positive integer, such as between about 100 and about 10,000, such as about 700 and about 5000.

In some embodiments, a polymer that is substituted but is not crosslinked to another polymer has the structure:

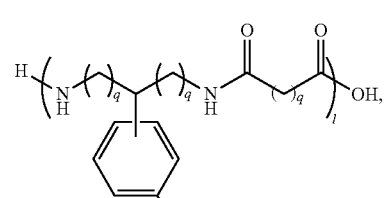

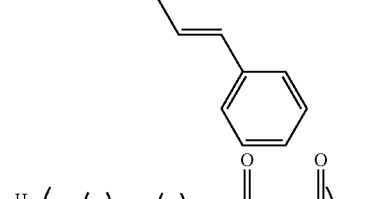

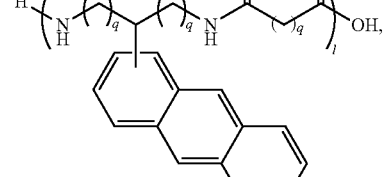

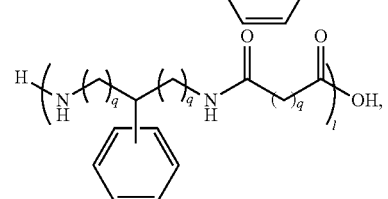

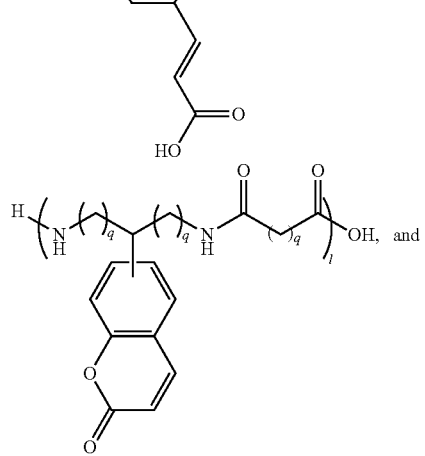

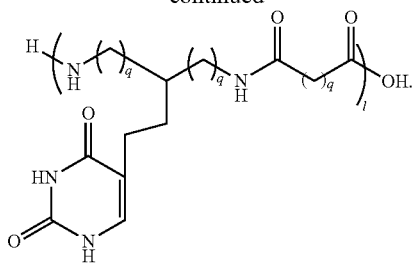

'q' is a positive integer between about 1 and about 30, such as 1 and about 10, and 'l' is a positive integer, such as between about 100 and about 10,000, such as about 700 and about 5000.

In some embodiments, a polymer material for 3D printing is the reaction product of a first polymer and a second polymer forming a polymer network. In some embodiments, the first polymer and the second polymer are independently selected from polylactic acid, poly(acrylonitrile butadiene styrene), polystyrene, nylon, high density polyethylene, polycarbonate, polyvinyl alcohol, polyethylene terephthalate, and thermoplastic polymers. The first polymer and/or the second polymer may be substituted with a photo-crosslinkable moiety. In some embodiments, a polymer network further comprises a third polymer that is not substituted with a photo-crosslinkable moiety. The first polymer, second polymer, and/or third polymer may be substituted with one or more electron-withdrawing groups and/or one or more electron donating groups. Electron-withdrawing groups include —$NO_2$, —OH, aryl and halo. Aryl includes C1-C15 aromatic hydrocarbons, such as phenyl and benzyl. Halo includes fluoro, chloro, bromo, and iodo. Electron-donating groups include linear or branched alkyl and alkoxy. Alkyl includes C1-C20 alkyl, such as C2-C6 alkyl. Alkoxy includes C1-C20 alkoxy, such as C2-C6 alkoxy. A third polymer includes polylactic acid, poly(acrylonitrile butadiene styrene), polystyrene, nylon, high density polyethylene, polycarbonate, polyvinyl alcohol, polyethylene terephthalate, and thermoplastic polymers. In some embodiments, a polymer network for 3D printing is the reaction product of a pigment. In some embodiments, a polymer network for 3D printing is the reaction product of a filler. As described herein, "a polymer network that is the reaction product" includes polymer networks that are the reaction product of two or more components of a reaction mixture. A "polymer network that is the reaction product" does not require a chemical transformation of each component of a starting mixture. A "polymer network that is the reaction product" includes, but is not limited to, a starting mixture having two or more components that undergo a chemical transformation in the reaction mixture or polymer network.

In some embodiments, the first polymer and/or second polymer is of the structure:

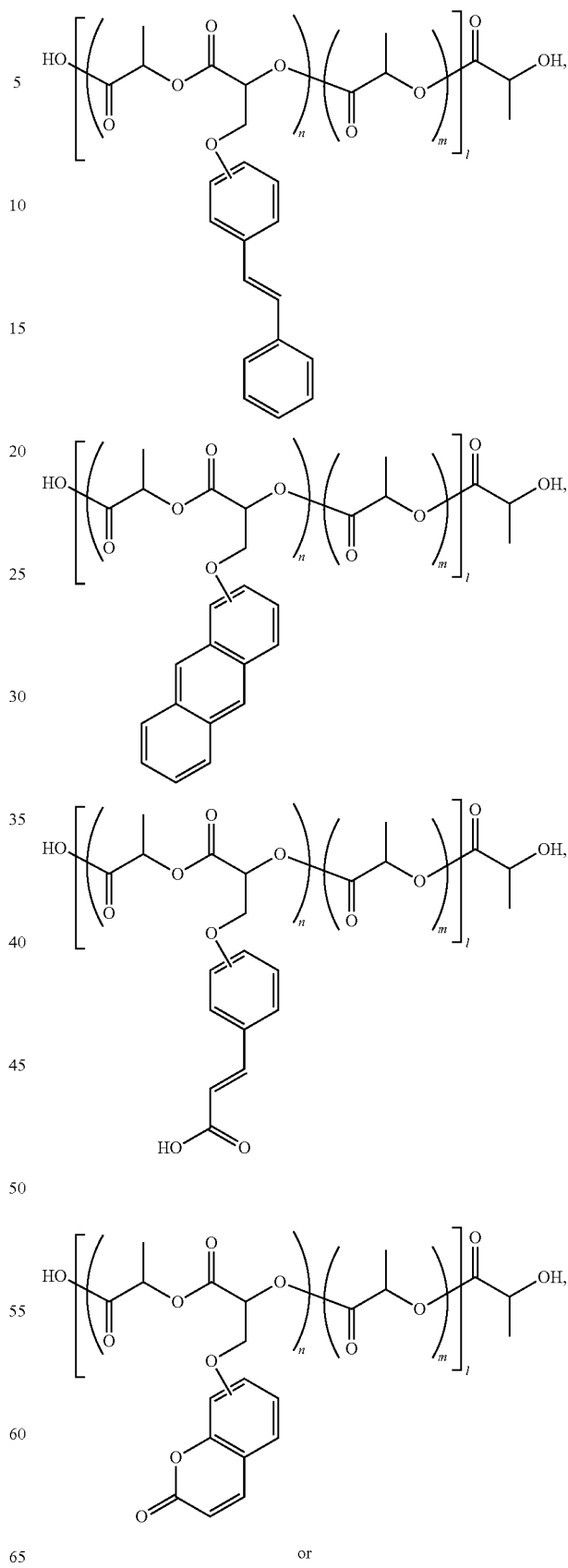

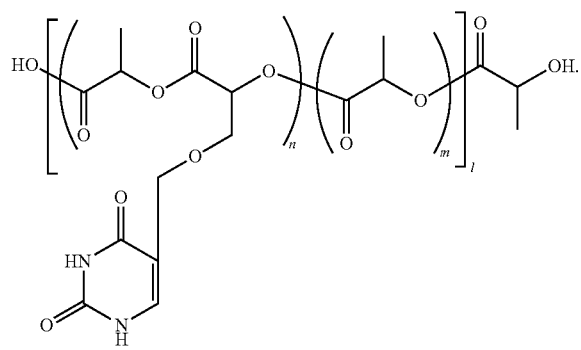

'n' is a positive integer, such as between about 1 and about 100, such as about 1 and about 10. 'm' is a positive integer, such as between about 1 and about 100, such as about 2 and about 20. 'l' is a positive integer, such as between about 100 and about 10,000, such as about 700 and about 5,000.

In some embodiments, the first polymer and/or second polymer is of the structure:

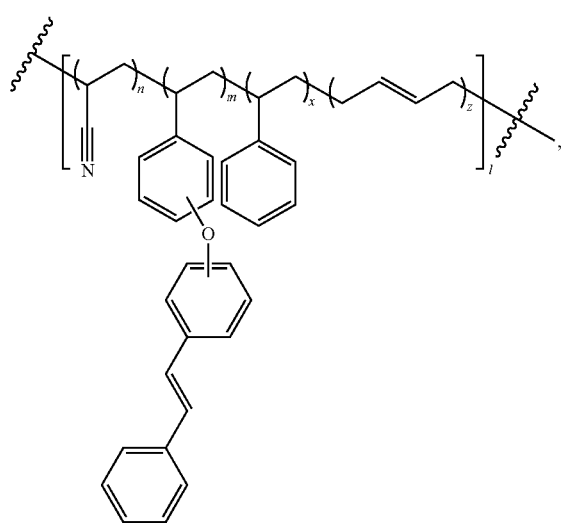

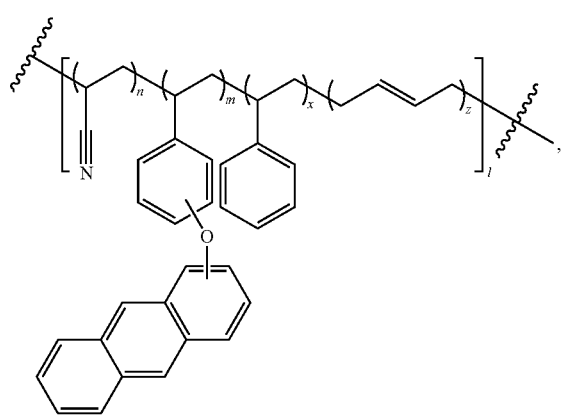

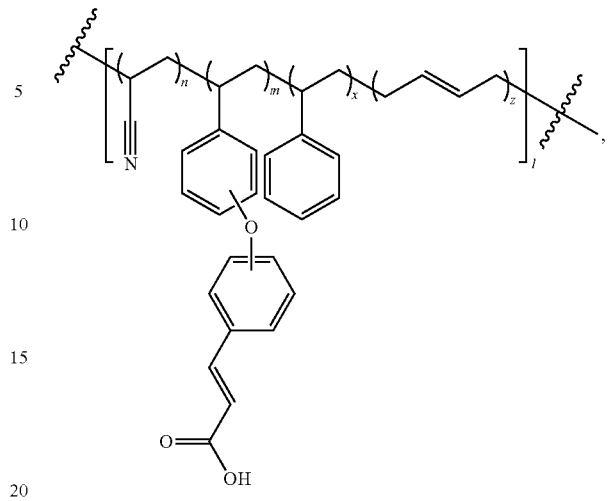

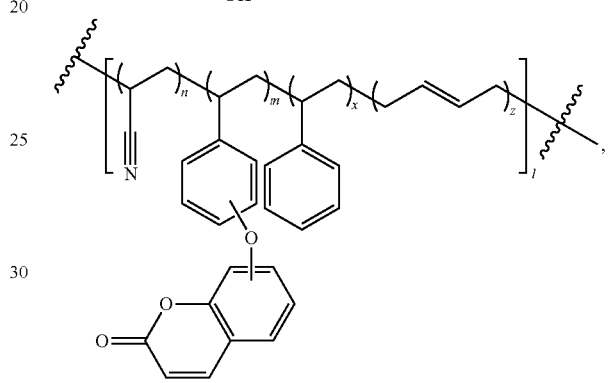

or

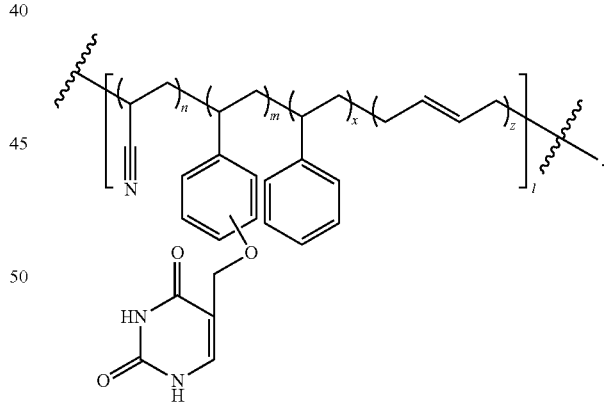

'n' is a positive integer, such as between about 1 and about 100, such as about 5 and about 35. 'm' is a positive integer, such as between about 1 and about 100, such as about 5 and about 60. 'x' is an integer, such as between 0 and about 150, such as about 1 and about 90. 'z' is a positive integer, such as between about 1 and about 100, such as about 5 and about 35. 'l' is a positive integer, such as between about 100 and about 10,000, such as about 700 and about 5000.

In some embodiments, the first polymer and/or second polymer is of the structure:

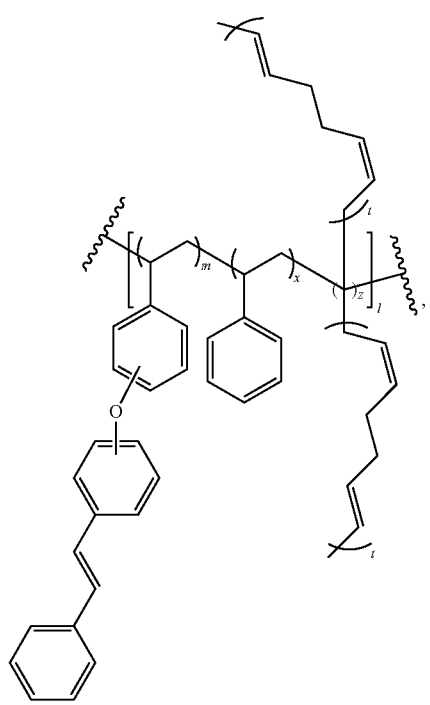
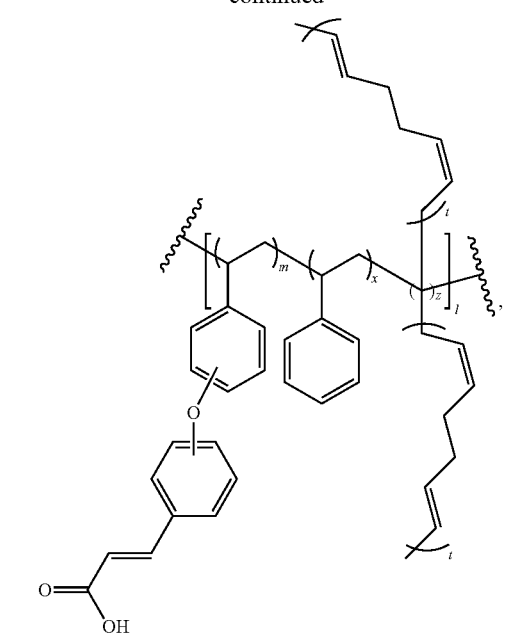
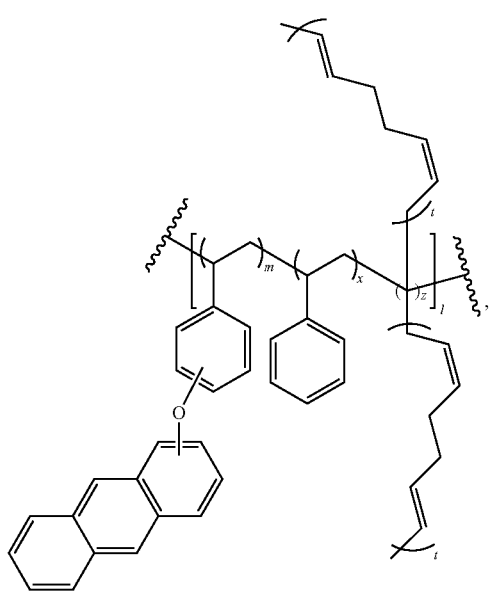
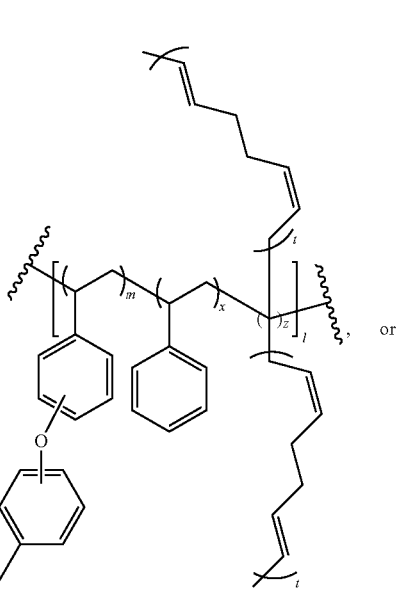, or

29

-continued

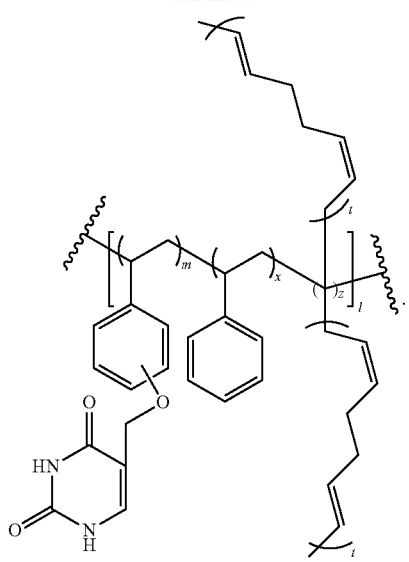

'm' is a positive integer, such as between about 1 and about 100, such as about 5 and about 60. 'x' is an integer, such as between about 0 and about 90. 'z' is a positive integer, such as between about 1 and about 100, such as about 5 and about 35. 't' is a positive integer, such as between about 1 and about 100, such as about 20 and about 60. 'l' is a positive integer, such as between about 100 and about 10,000, such as about 700 and about 5,000.

In some embodiments, the first polymer and/or second polymer is of the structure:

30

-continued

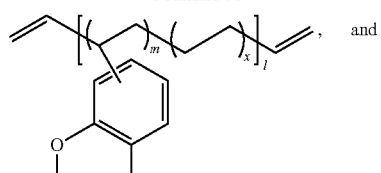

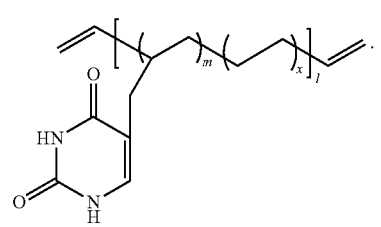

'm' is a positive integer, such as between about 1 and about 100, such as about 1 and about 10. 'x' is a positive integer, such as between about 1 and about 100, such as about 2 and about 20. 'l' is a positive integer, such as between about 100 and about 10,000, such as about 700 and about 5000.

In some embodiments, the first polymer and/or second polymer is of the structure:

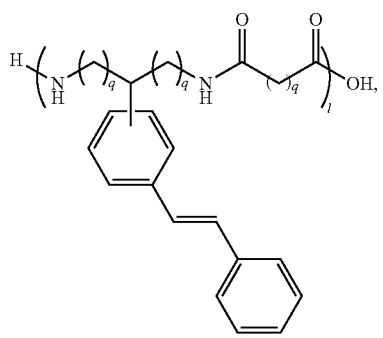

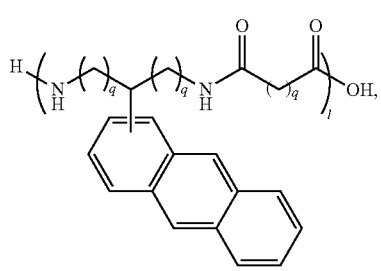

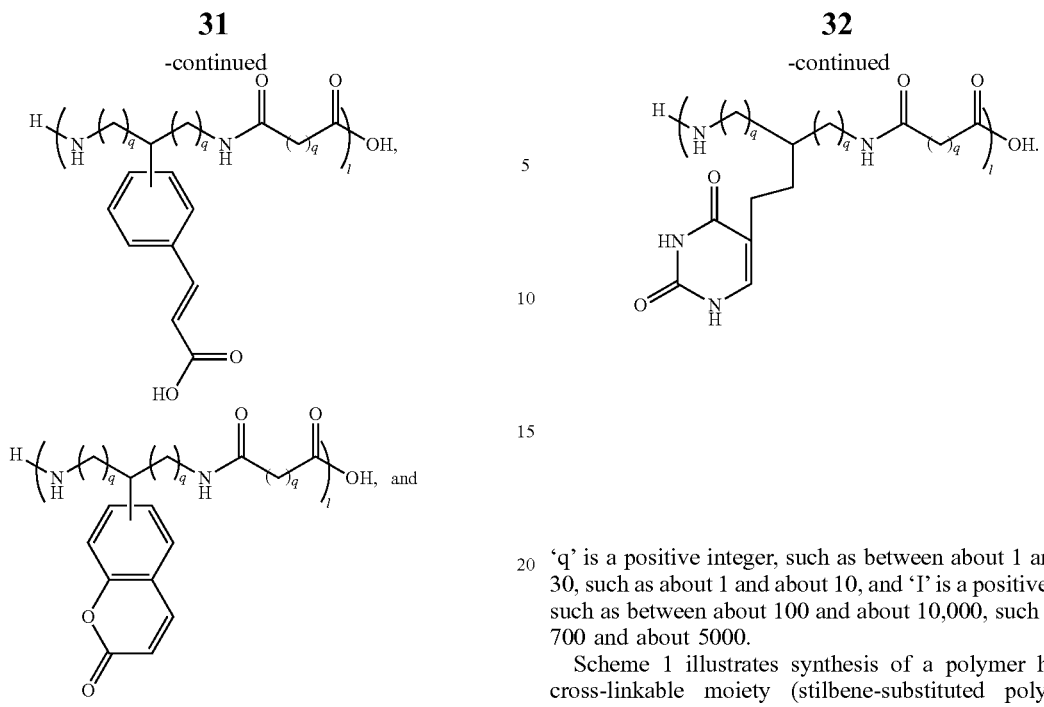
'q' is a positive integer, such as between about 1 and about 30, such as about 1 and about 10, and 'l' is a positive integer, such as between about 100 and about 10,000, such as about 700 and about 5000.
Scheme 1 illustrates synthesis of a polymer having a cross-linkable moiety (stilbene-substituted polylactide), according to some embodiments.
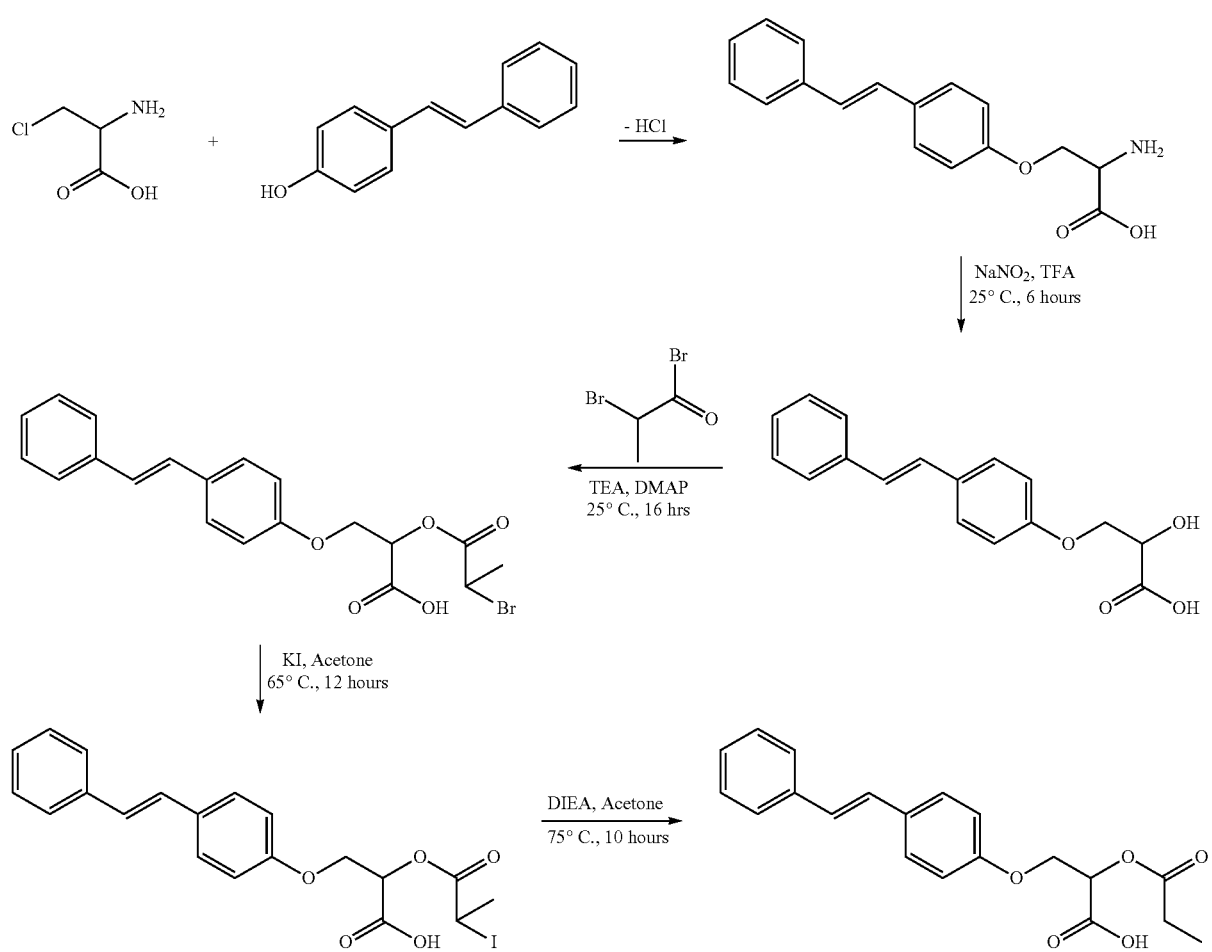

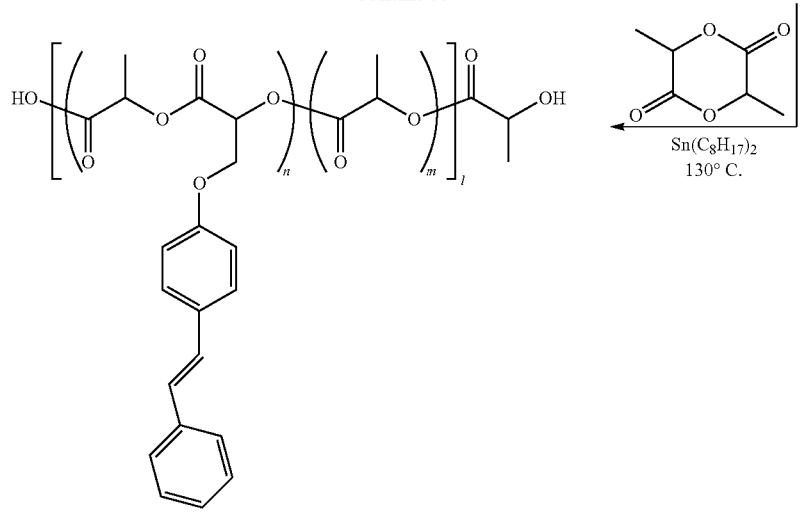

As shown in Scheme 1, hydroxyl stilbene is treated with chloro-alanine to yield an alanine-substituted stilbene. Hydrolysis of the amino moiety of the alanine-substituted stilbene may be accomplished by treating alanine-substituted stilbene with sodium nitrate and trifluoro acetic acid to yield the hydrolyzed-alanine-stilbene product. The hydrolyzed-alanine-stilbene product is then treated with 2-bromopropionyl bromide in the presence of triethylamine and 4-(dimethylamino)pyridine to yield a bromo-stilbene product. The bromo-stilbene product is treated with potassium iodide in the presence of acetone to yield an iodo-stilbene product. The iodo-stilbene product undergoes cyclization upon treatment with N,N-diisopropylethylamine in the presence of acetone to yield a stilbene-lactide product. The stilbene-lactide may undergo polymerization with lactide, for example in the presence of dioctyl tin, to form a stilbene-substituted polylactide.

Scheme 2 illustrates photo-crosslinking of a polymer having a cross-linkable moiety (stilbene-substituted polylactide), according to some embodiments.

Scheme 2

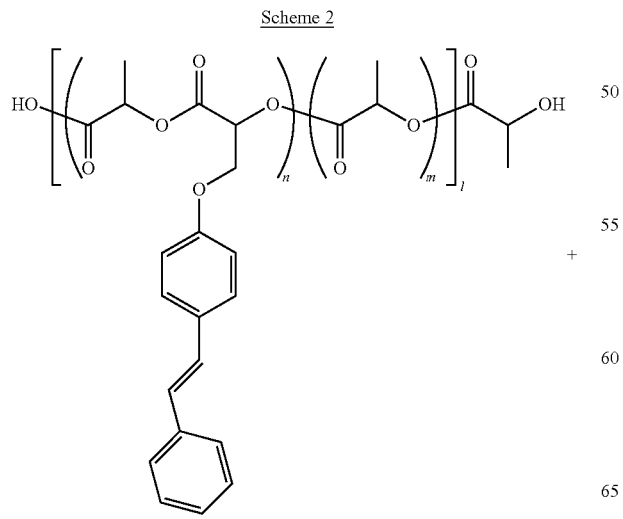

+

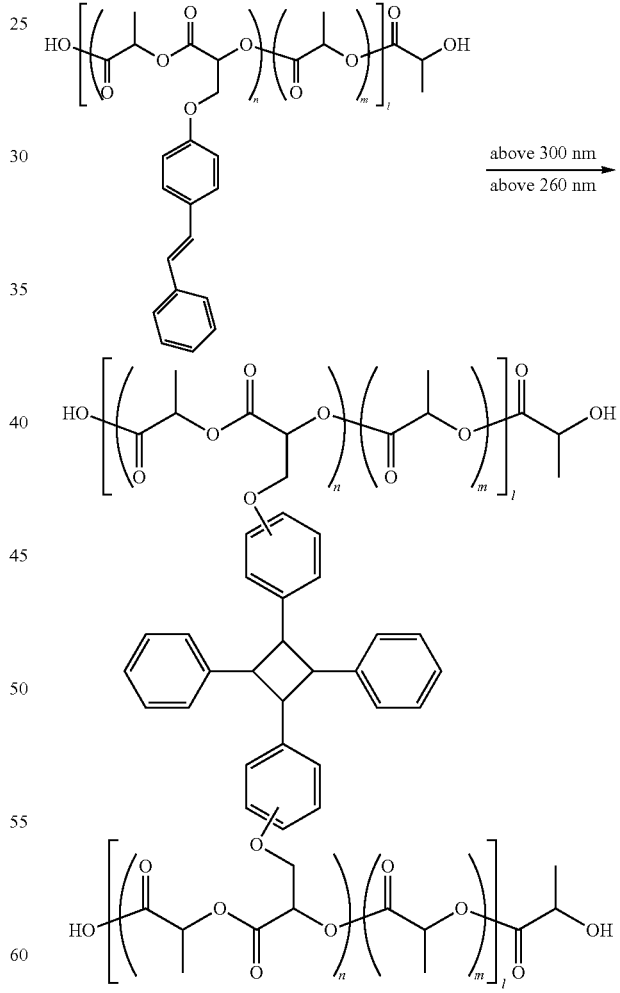

As shown in Scheme 2, a first stilbene-substituted polylactide is crosslinked with a second stilbene-substituted polylactide to form a crosslinked polymer network. Crosslinking may be promoted by irradiating a reaction mixture containing the first stilbene-substituted polylactide and the second stilbene-substituted polylactide at a wavelength of about 300 nm. One advantage of stilbene crosslinks within a polymer network is that the crosslinks are photo-reversible crosslinks. For example, irradiating the crosslinked polymer network at a wavelength of about 260 nm decomposes some or all of the stilbene-crosslinks in the polymer network to yield starting materials (e.g., stilbene-polylactides as shown in Scheme 2). Formation of a crosslinked polymer network allows control of physical properties of a reaction mixture/polymer material by utilizing ultraviolet light. A photo-reversible crosslinked network allows further control of physical properties of a reaction mixture/polymer material by utilizing ultraviolet light.

Scheme 3 illustrates synthesis of a polymer having a cross-linkable moiety (stilbene-substituted acrylonitrile butadiene styrene), according to some embodiments.

styryl-substituted stilbene undergoes polymerization in the presence of 1,3-butadiene and acrylonitrile to form a stilbene-substituted acrylonitrile butadiene styrene.

Scheme 4 illustrates photo-crosslinking a polymer having a cross-linkable moiety (stilbene-substituted acrylonitrile butadiene styrene), according to some embodiments.

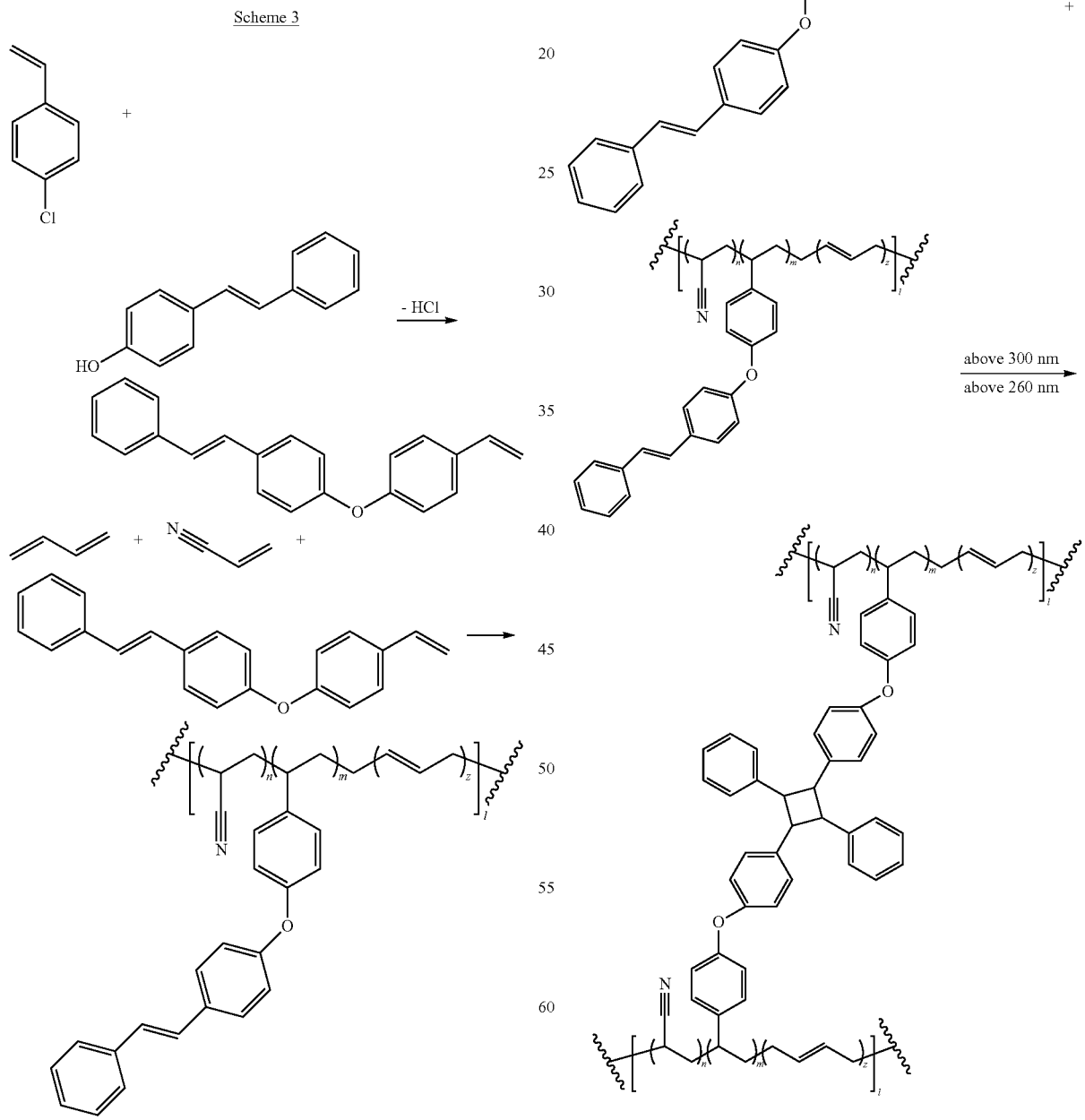

As shown in Scheme 3, hydroxyl stilbene is treated with 4-chloro-styrene to yield a styryl-substituted stilbene. The As shown in Scheme 4, a first stilbene-substituted acrylonitrile butadiene styrene is crosslinked with a second stilbene-substituted acrylonitrile butadiene styrene to form a crosslinked polymer network. Crosslinking may be promoted by irradiating a reaction mixture containing the first stilbene-substituted acrylonitrile butadiene styrene and the second stilbene-substituted acrylonitrile butadiene styrene at a wavelength of about 300 nm. One advantage of stilbene crosslinks within a polymer network is that the crosslinks are photo-reversible crosslinks. For example, irradiating the crosslinked polymer network at a wavelength of about 260 nm decomposes some or all of the stilbene-crosslinks in the polymer network to yield starting materials (e.g., stilbene-substituted acrylonitrile butadiene styrene as shown in Scheme 2). Formation of a crosslinked polymer network allows control of physical properties of a reaction mixture/polymer material using ultraviolet light. A photo-reversible crosslinked network allows further control of physical properties of a reaction mixture/polymer material using ultraviolet light.

Schemes 2 and 4 illustrate crosslinking a first polymer having a photo-crosslinkable moiety with a second polymer having a photo-crosslinkable moiety, and the first and second polymers have the same polymer backbone and photo-crosslinkable moieties. However, polymer networks of the present disclosure include polymer networks having a first polymer and a second polymer having a different backbone and/or different cross-linkable moieties than the first polymer. Furthermore, polymer networks of the present disclosure include polymer networks having a first polymer and a second polymer having the same backbone and/or photo-crosslinkable moieties and a third polymer having a different polymer backbone and/or cross-linkable moieties as the first polymer and the second polymer.

FIG. 1 illustrates the storage modulus of a reaction mixture/polymer material containing polymers having photo-crosslinkable/crosslinked moieties, according to some embodiments. As shown in FIG. 1, the storage modulus (MegaPascals (MPa)) of a reaction mixture 102 containing polymers having photo-crosslinkable moieties may be increased upon irradiating the reaction mixture with ultraviolet light to form a 100% crosslinked polymer network 104, in comparison to the storage modulus of reaction mixture 102 that has not been irradiated with ultraviolet light. As described herein, a "100% crosslinked polymer network" is a polymer network having substantially all photo-crosslinkable moieties of polymers within the network crosslinked with other photo-crosslinkable moieties of polymers in the network. Upon irradiation with ultraviolet light, the storage modulus of a reaction mixture moves from line 102 toward line 104 as crosslinking within the reaction mixture/polymer network progresses. Pulse parameters of an ultraviolet light source of a 3D printer may also help to control the extent of cross-linking of a polymer network. For example, an increase in pulse intensity or pulse duration promotes further cross-linking within a polymer network. In some embodiments, pulse intensity is between about 0.1 mW/cm$^2$ and about 150 mW/cm$^2$, such as about 1 mW/cm$^2$ and about 100 mW/cm$^2$, such as 5 mW/cm$^2$ and about 50 mW/cm$^2$, such as about 10 mW/cm$^2$ and about 25 mW/cm$^2$. In some embodiments, a pulse duration is between about 2 seconds and about 40 seconds, such as about 10 seconds and 20 seconds. In some embodiments, a time delay in between two pulses is between about 1 second and about 6 seconds, such as about 2 seconds and about 4 seconds. Furthermore, particular pulse wavelength(s) may be used that promote cross-linking within a polymer network more efficiently than other wavelengths. In some embodiments, a pulse wavelength is between about 200 nm and about 400 nm, such as about 300 nm and about 350 nm.

In a polymer material having a polymer network where photo-crosslinks are photo-reversible, irradiation of the polymer material/network with a different wavelength of ultraviolet light promotes a decrease in storage modulus of the polymer network, e.g. the storage modulus of a polymer material/network moves from line 104 toward line 102 as the crosslinks decompose, as described herein. In some embodiments, a pulse wavelength for decomposing cross-links is between about 200 nm and about 400 nm, such as about 250 nm and about 290 nm. Crosslinkable polymers and crosslinked polymer networks described herein allow control of physical properties, such as the storage modulus, of a reaction mixture/polymer material utilizing ultraviolet light. In some embodiments, a polymer material has between about 10 wt % and about 90 wt % cross-linked polymers, such as between about 40 wt % and about 60 wt %.

Overall, methods, polymers, and polymer networks described herein allow rapid formation of dynamically crosslinked/cured networks during or after material deposition of a printable medium. Extensive crosslinking of such a medium yields a rigid structure with mechanical properties that facilitate the printing of macroscale objects. In addition, a material with reversible thermosetting properties allows further control of the physical properties of a printed object after it is printed, offering an additional level of control not available when traditional materials are utilized as print media. In addition, the blending of materials that can participate in network formation provides tailorable mechanical properties in a printed object. Use of such materials in 3D-printing methods and apparatus expands the applicability of 3D printing.

While the foregoing is directed to embodiments of the present disclosure, other and further embodiments of the present disclosure may be devised without departing from the basic scope thereof.

We claim:

1. A polymer material for 3D printing comprising:
   a first polymer and
   a second polymer, wherein the first polymer and the second polymer are crosslinked by a photo-crosslink forming a polymer network, wherein the polymer network comprises at least one of:
   a first structure selected from the group consisting of:

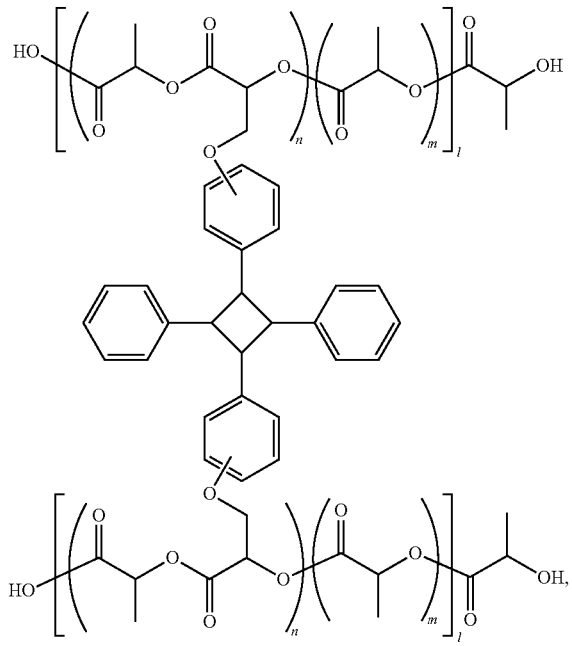

39
-continued
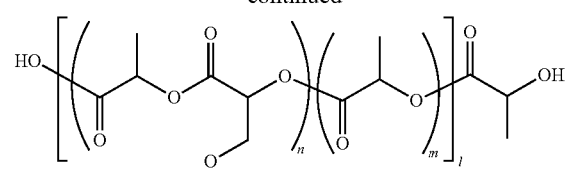
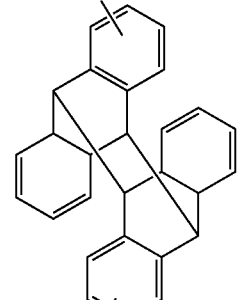
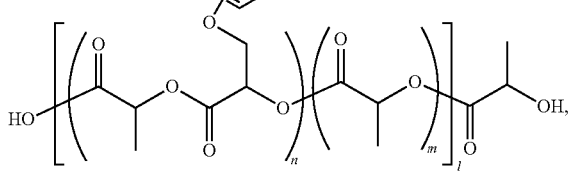
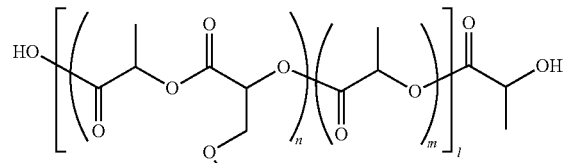
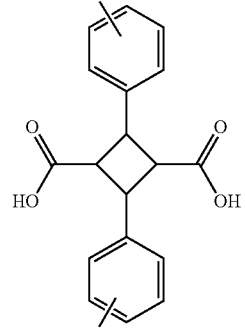
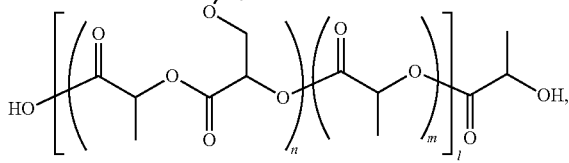
40
-continued
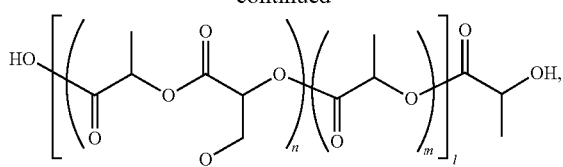
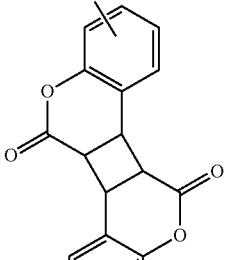
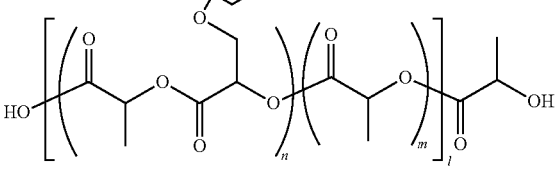
and
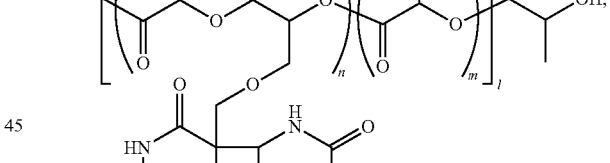
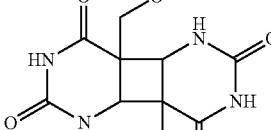
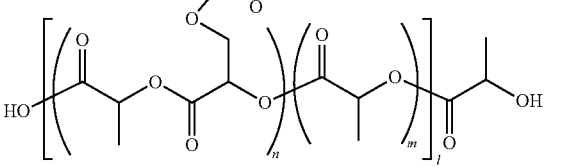
wherein n is a positive integer, m is a positive integer, and l is a positive integer, a second structure selected from the group consisting of:
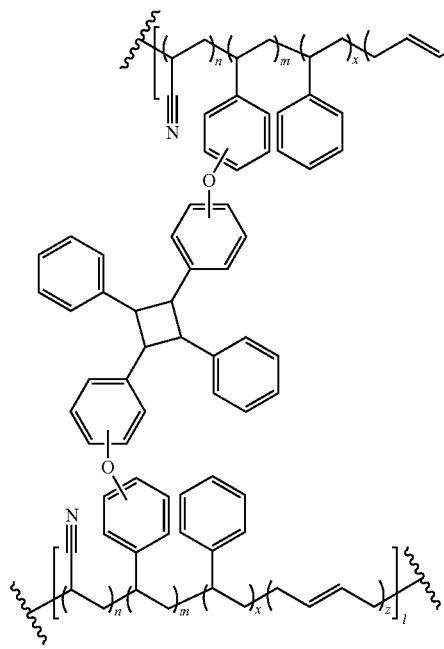
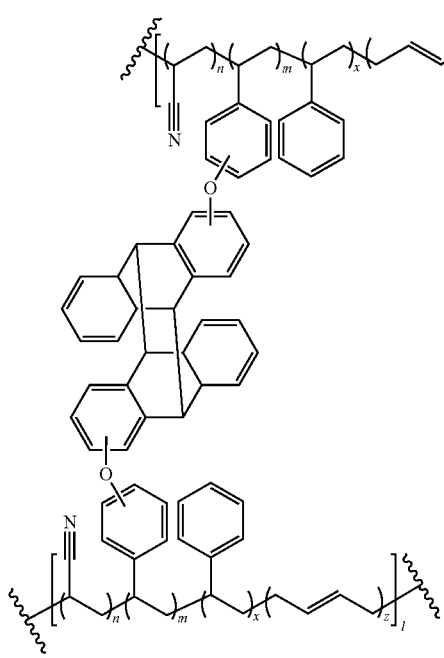
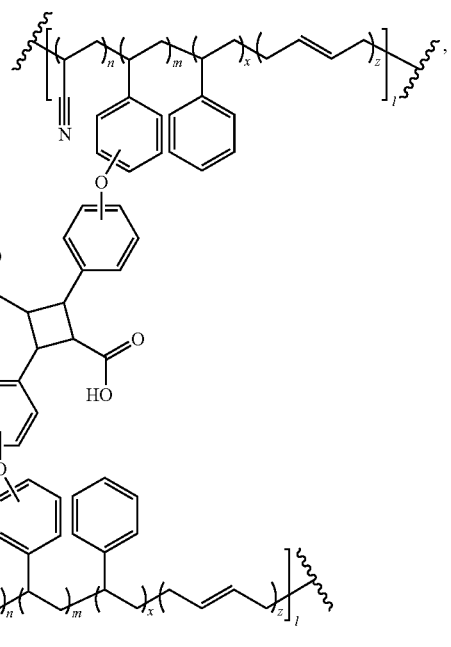
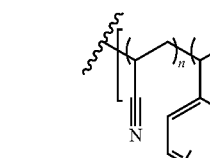

-continued
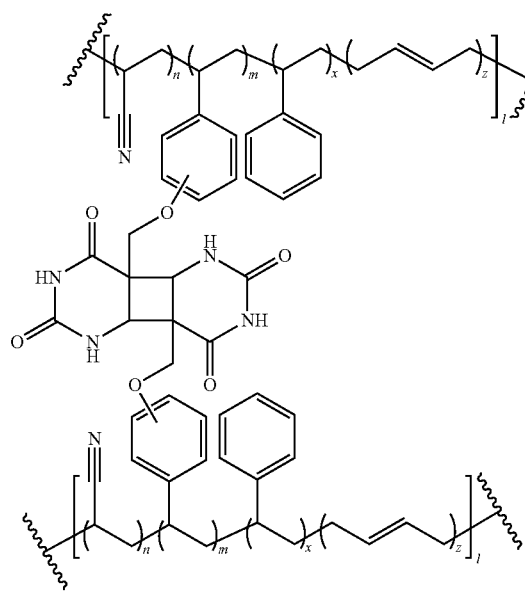
wherein n is a positive integer, m is a positive integer, x is an integer between 0 and about 90, z is a positive integer, and l is a positive integer,
a third structure selected from the group consisting of:
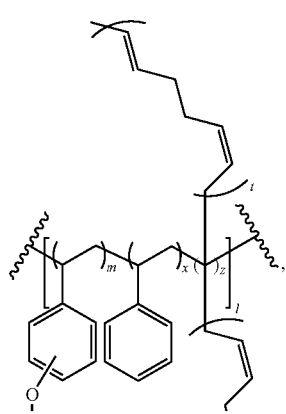
-continued
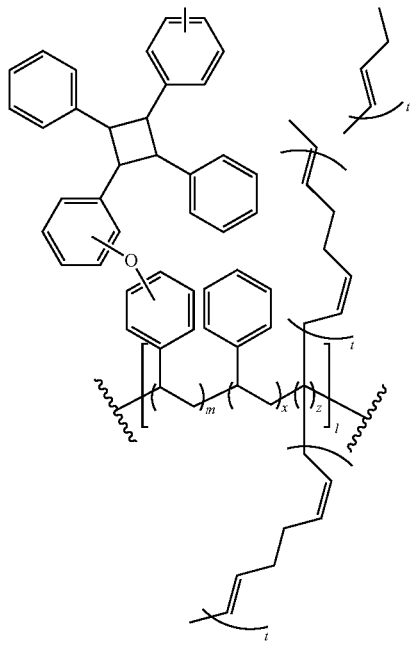
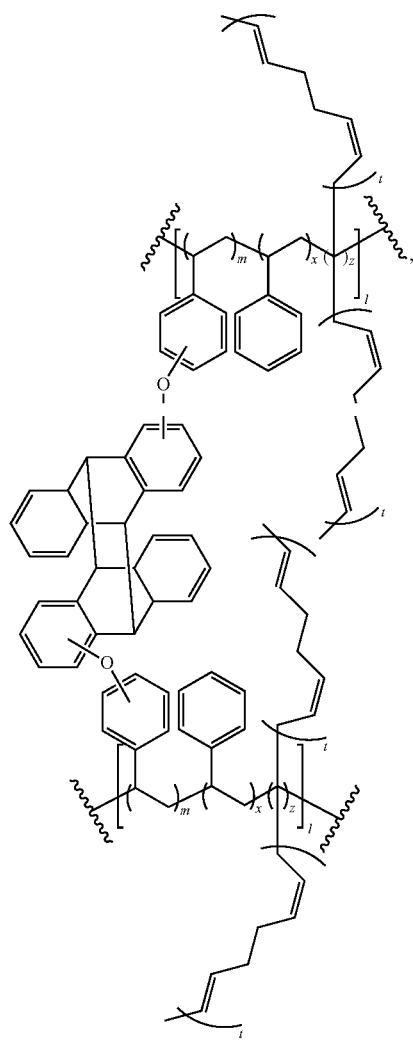

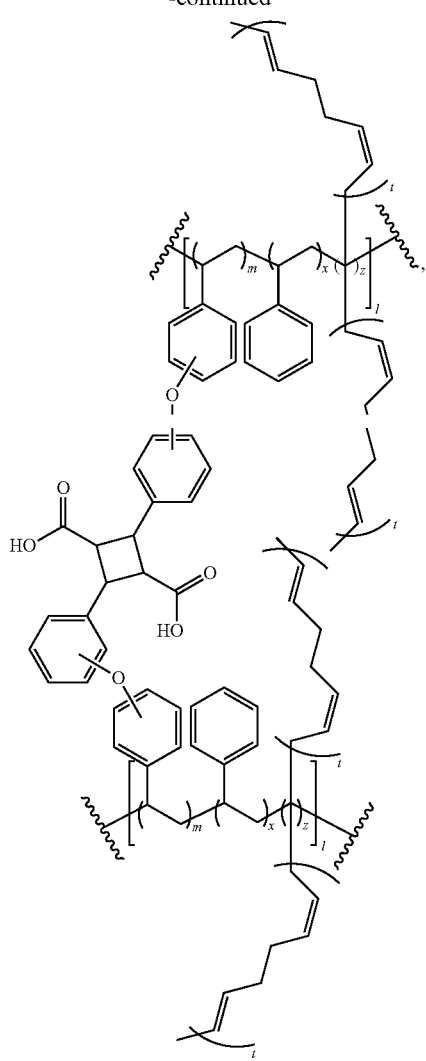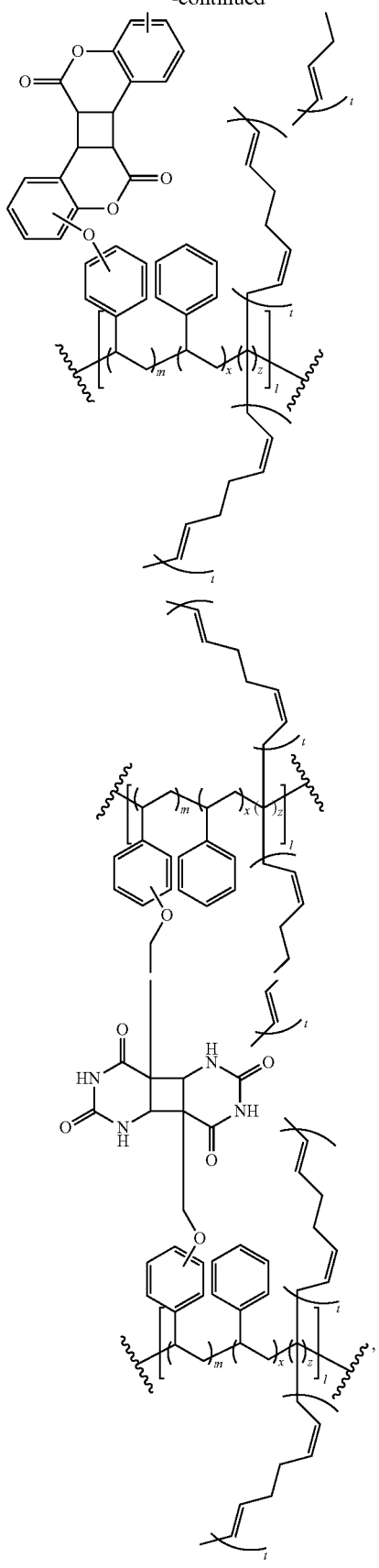

wherein m is a positive integer, x is an integer between 0 and about 90, z is a positive integer, t is a positive integer, and l is a positive integer, a fourth structure selected from the group consisting of:
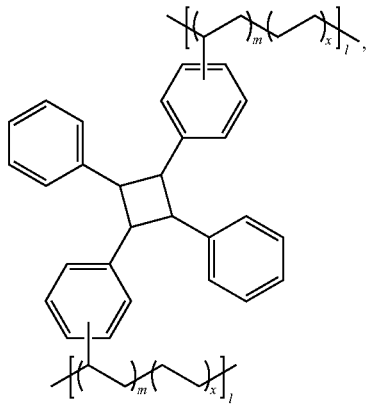
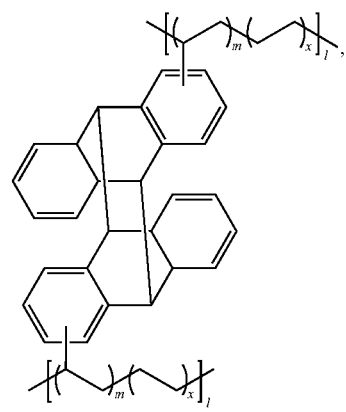
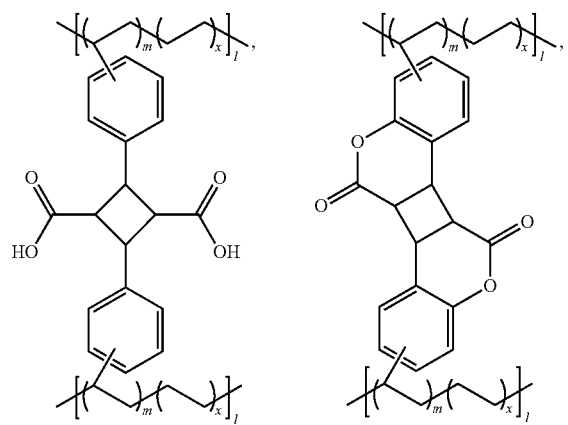
wherein m is a positive integer, x is a positive integer, and l is a positive integer, or
a fifth structure selected from the group consisting of:
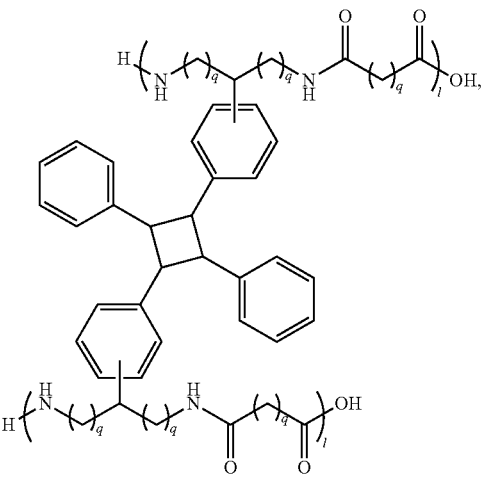
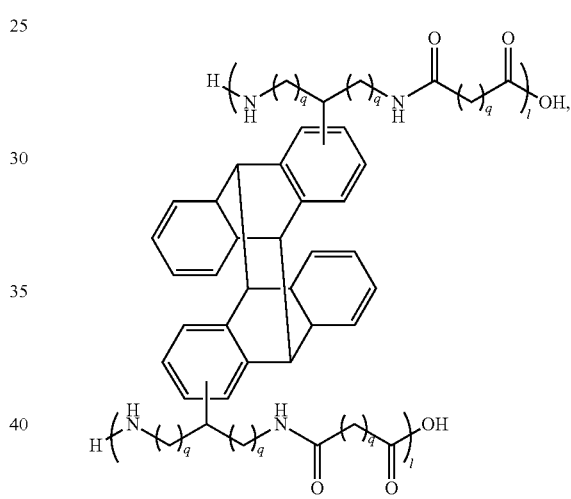
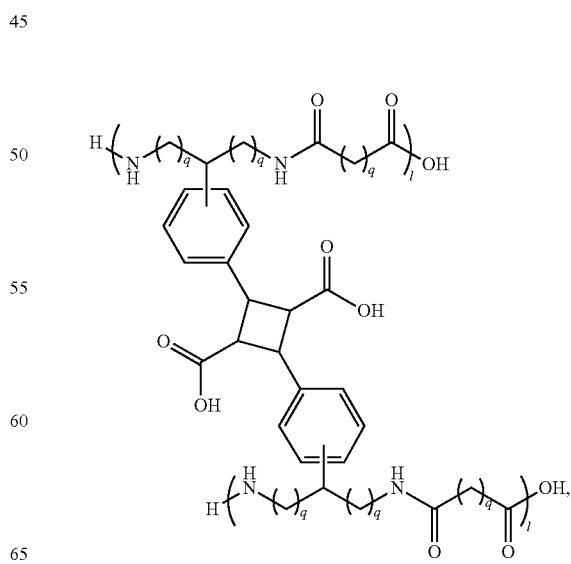

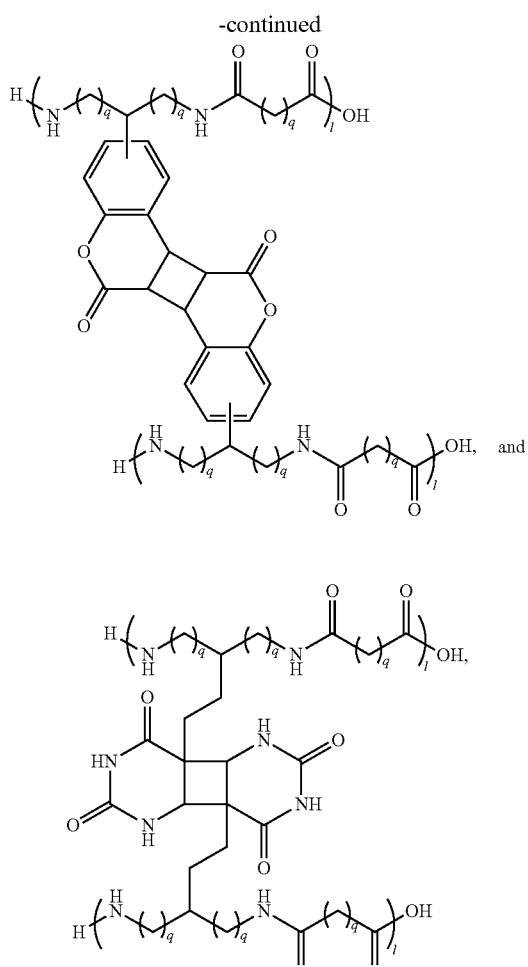

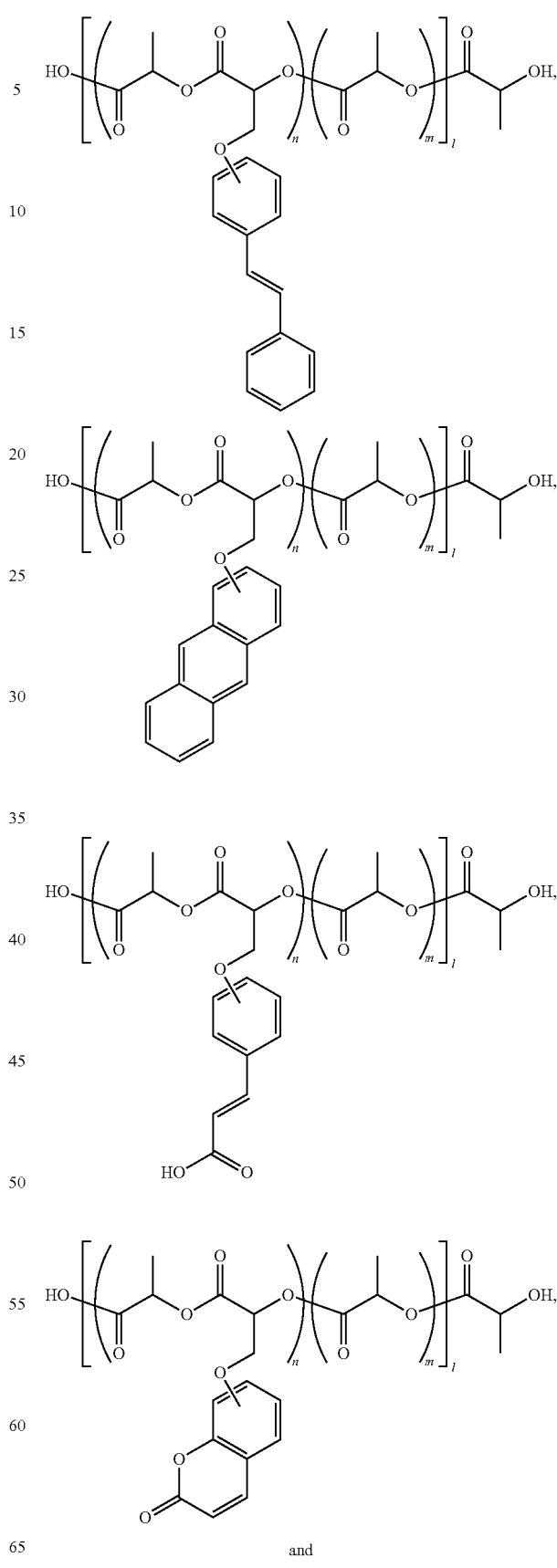

wherein q is a positive integer between 1 and about 30, and l is a positive integer.

2. The polymer material of claim 1, further comprising a third polymer that is not crosslinked to the first polymer or the second polymer.

3. The polymer material of claim 2, wherein the third polymer is unsubstituted polylactic acid, poly(acrylonitrile butadiene styrene), polystyrene, nylon, or high density polyethylene.

4. The polymer material of claim 2, wherein the portion of the polymer material that is the polymer network is between about 10 wt % and about 90 wt % of the polymer material.

5. The polymer material of claim 4, wherein the portion of the polymer material that is the polymer network is between about 40 wt % and about 60 wt % of the polymer material.

6. The polymer material of claim 2, wherein the third polymer is selected from the group consisting of polylactic acid, poly(acrylonitrile butadiene styrene), polystyrene, nylon, high density polyethylene, polycarbonate, polyvinyl alcohol, and polyethylene terephthalate.

7. The polymer material of claim 2, wherein the third polymer is selected from the group consisting of:

-continued

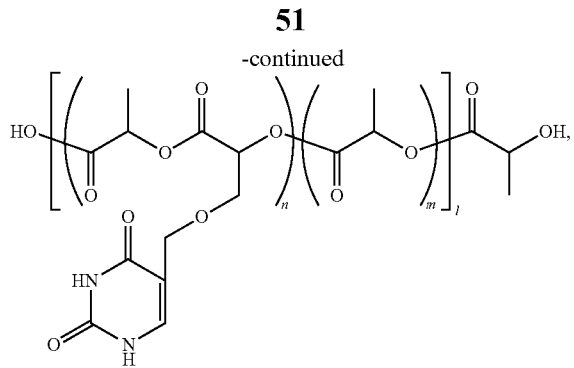

wherein n is a positive integer, m is a positive integer, and l is a positive integer.

8. The polymer material of claim 2, wherein the third polymer is selected from the group consisting of:

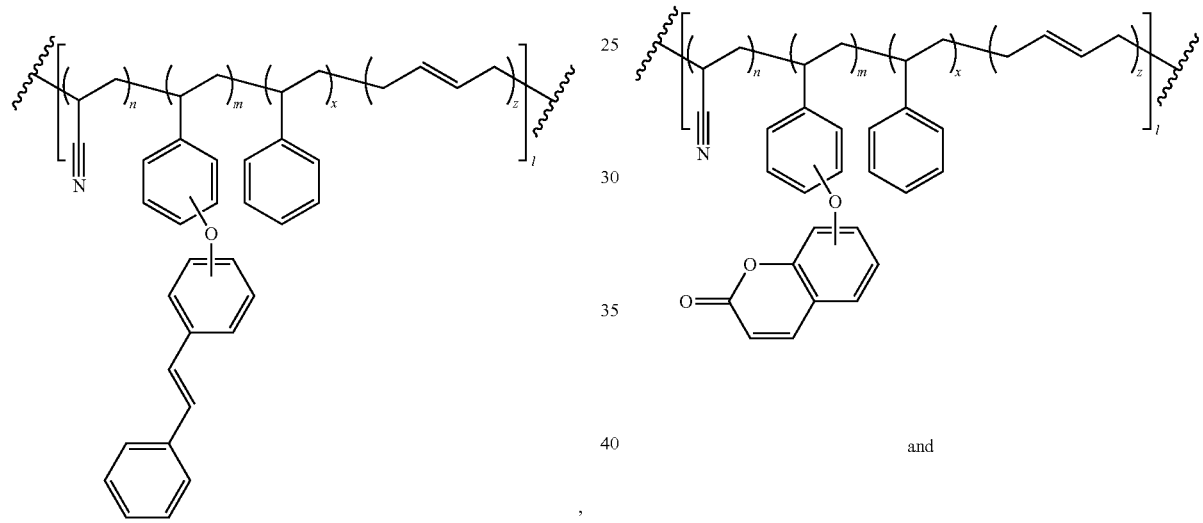

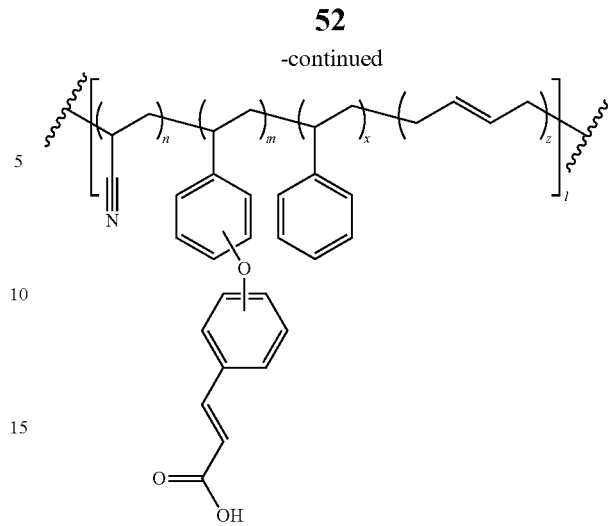

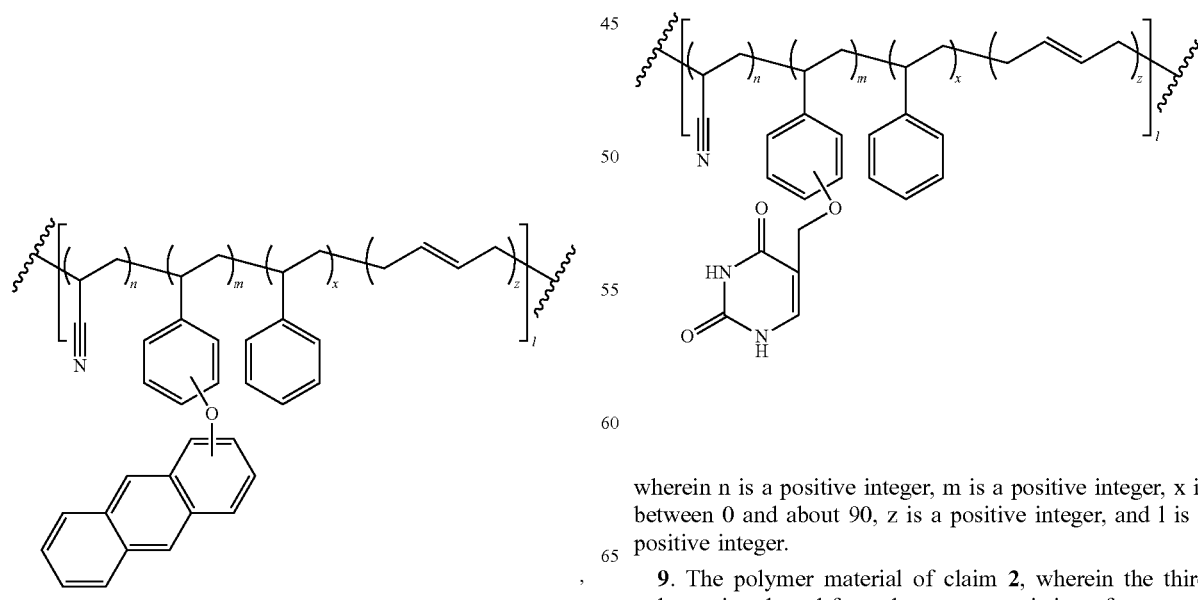

wherein n is a positive integer, m is a positive integer, x is between 0 and about 90, z is a positive integer, and l is a positive integer.

9. The polymer material of claim 2, wherein the third polymer is selected from the group consisting of:

53
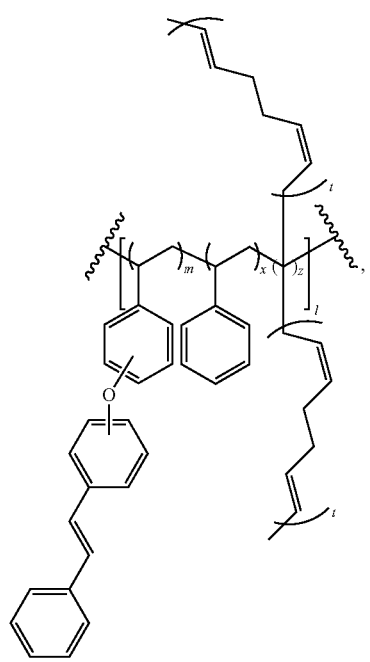
54
-continued
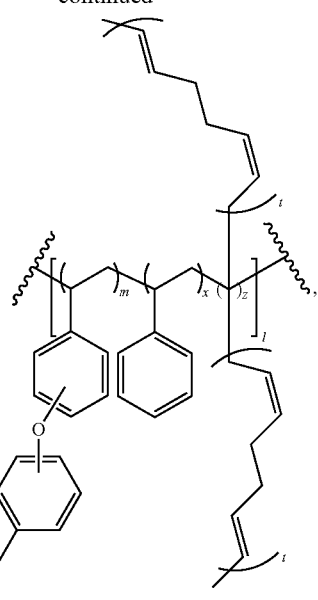
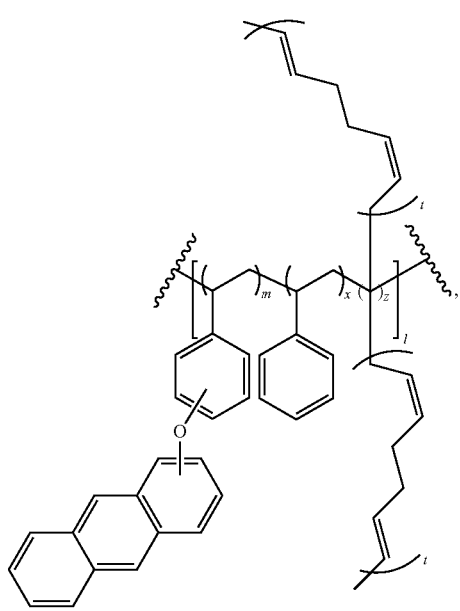
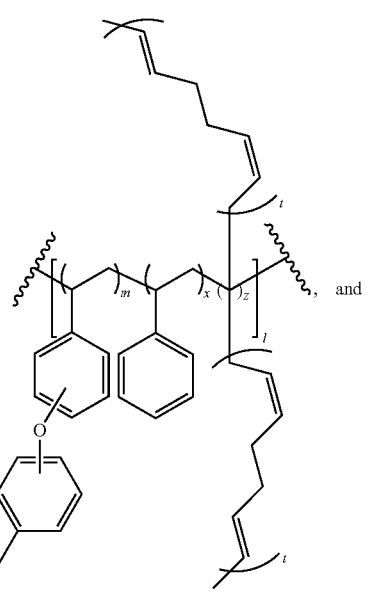, and

-continued

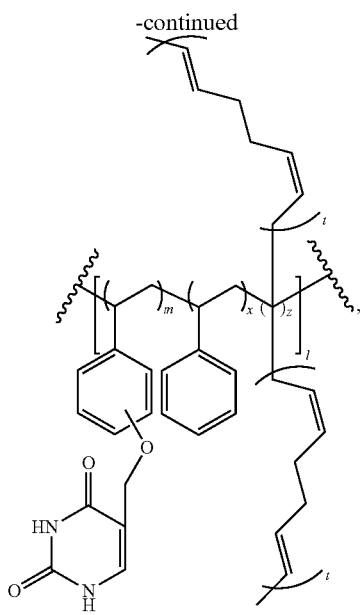

wherein m is a positive integer, x is an integer between 0 and about 90, z is a positive integer, t is a positive integer, and l is a positive integer.

10. The polymer material of claim 2, wherein the third polymer is selected from the group consisting of:

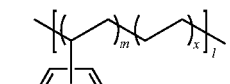 , 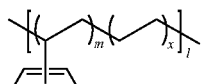 ,

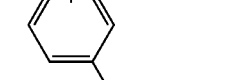 , 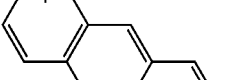 and

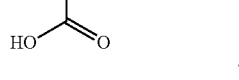 , wherein m is a positive integer, x is a positive integer, and l is a positive integer.

11. The polymer material of claim 2, wherein the third polymer is selected from the group consisting of:

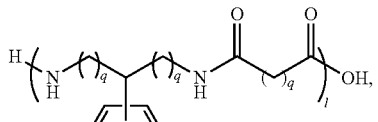

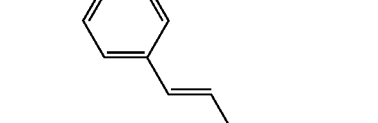

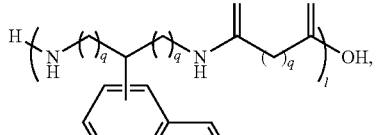

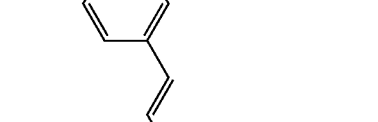 and

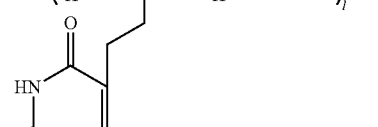

wherein q is a positive integer between about 1 and about 30, and l is a positive integer.

12. The polymer material of claim 1, further comprising a pigment.

13. The polymer material of claim 1, further comprising a filler.

14. A polymer material for 3D printing that is a reaction product of:

a first polymer; and a second polymer, wherein the first polymer and/or the second polymer is substituted with a photo-crosslinkable moiety, wherein the first polymer and/or second polymer is at least one of:

a first structure selected from the group consisting of:

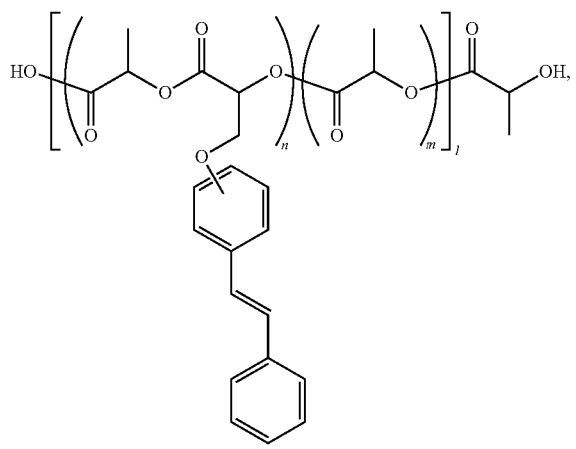

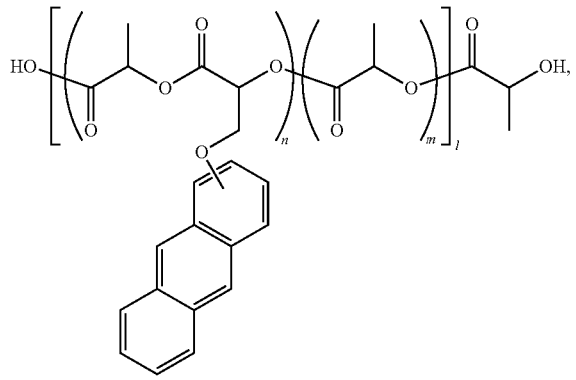

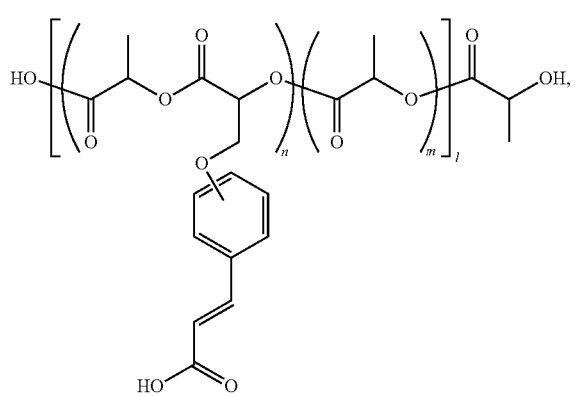

-continued

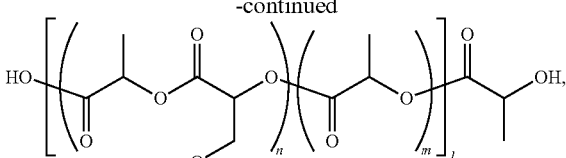

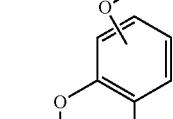

and

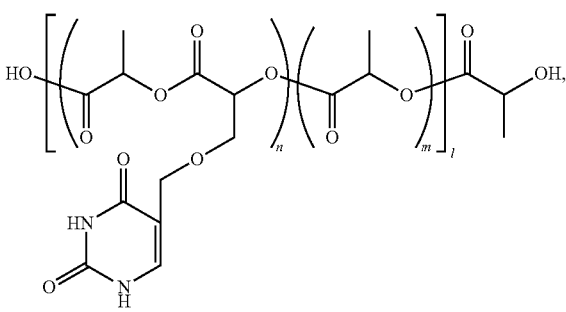

wherein n is a positive integer, m is a positive integer, and l is a positive integer, a second structure selected from the group consisting of:

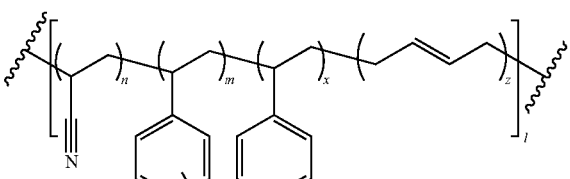

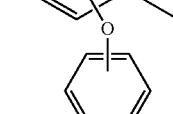

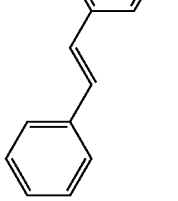

,

-continued
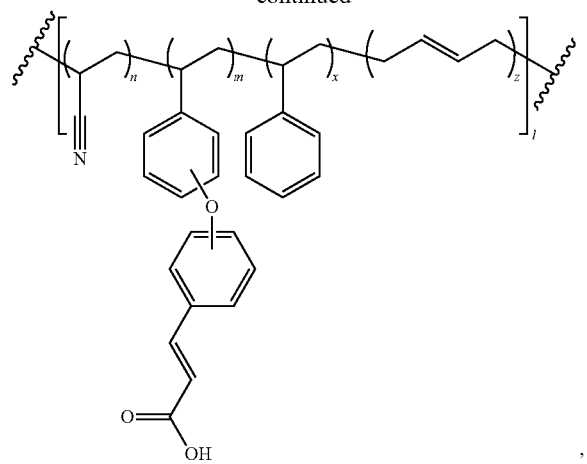
,
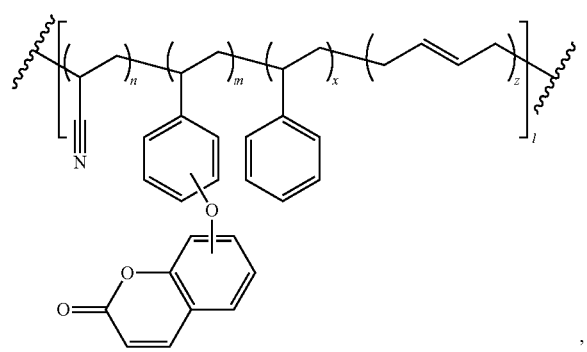
and
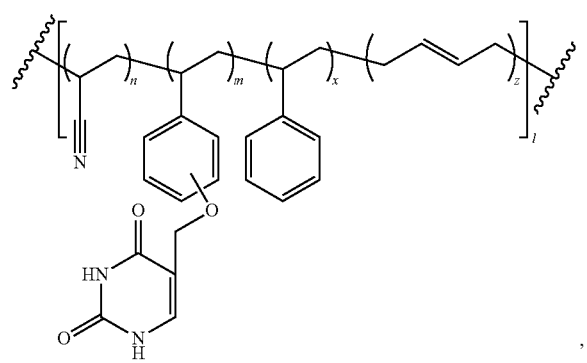
,
wherein n is a positive integer, m is a positive integer, x is an integer between 0 and about 90, z is a positive integer, and l is a positive integer,
a third structure selected from the group consisting of:
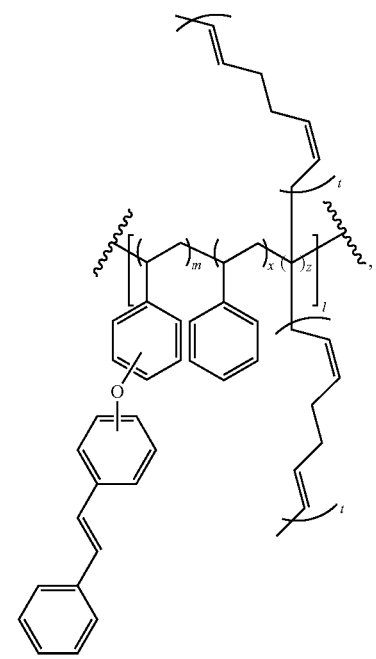
,
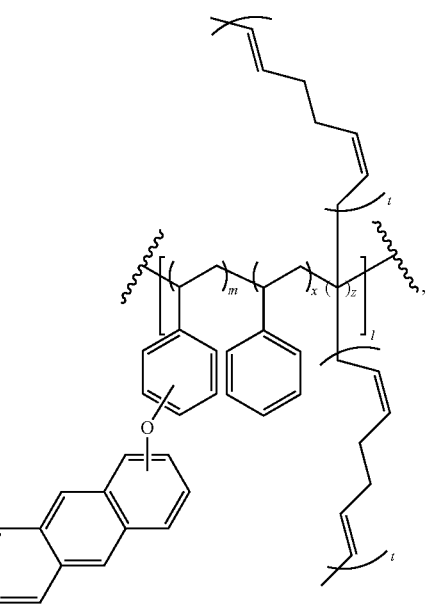
, -continued
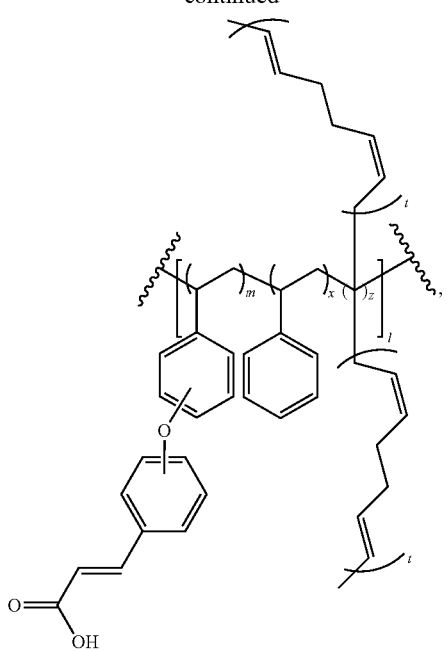
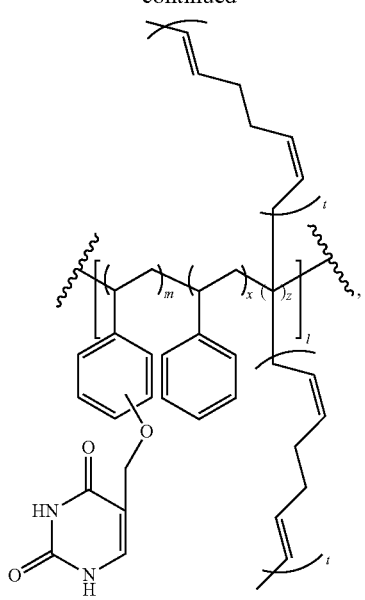
wherein m is a positive integer, x is an integer between 0 and about 90, z is a positive integer, t is a positive integer, and l is a positive integer, a fourth structure selected from the group consisting of:
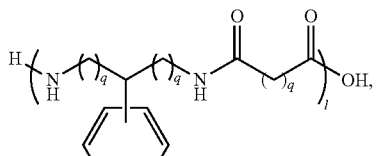
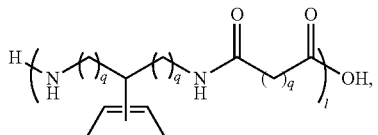
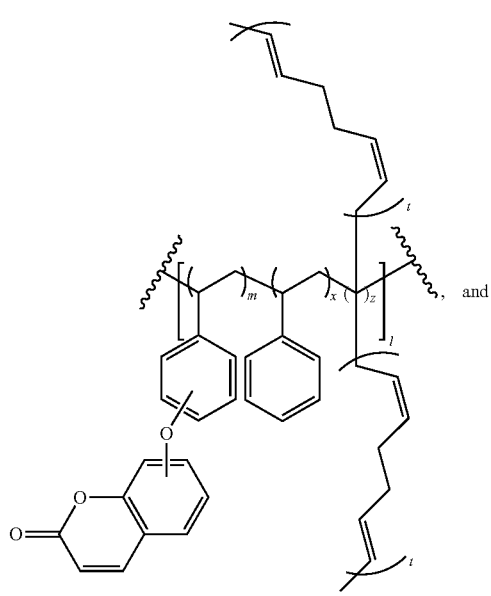, and
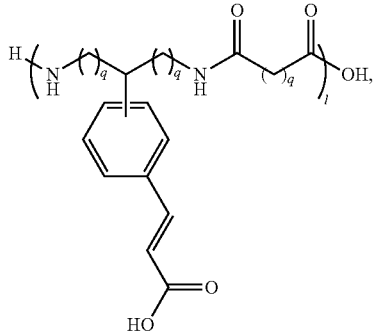

-continued

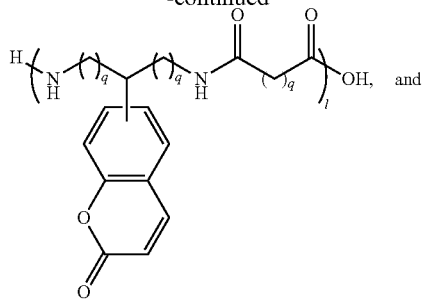

and

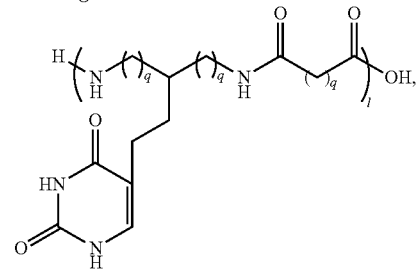

wherein q is a positive integer between about 1 and about 30, and l is a positive integer, or a fifth structure selected from the group consisting of:

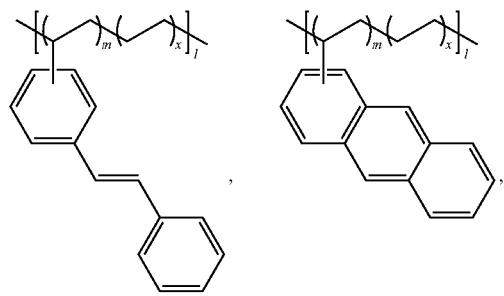

-continued

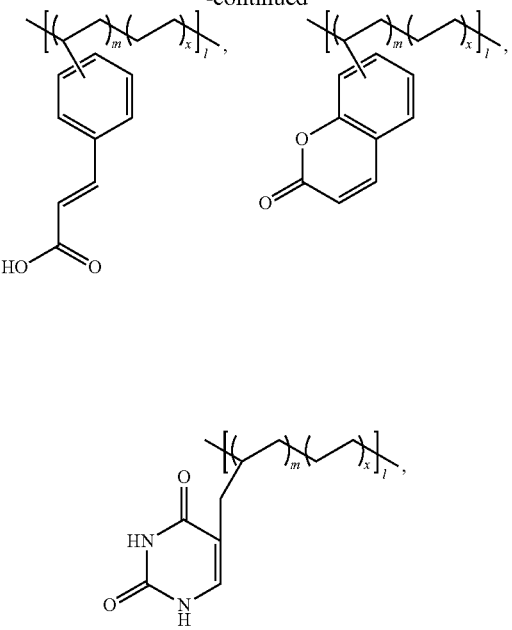

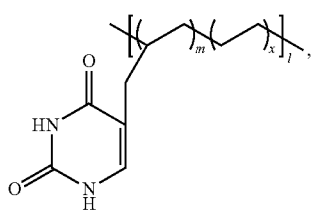

wherein m is a positive integer, x is a positive integer, and l is a positive integer.

15. The polymer material of claim 14, further comprising a pigment.

16. The polymer material of claim 14, further comprising a filler.

* * * * *